US011996039B2

(12) United States Patent
Zou et al.

(10) Patent No.: US 11,996,039 B2
(45) Date of Patent: *May 28, 2024

(54) DISPLAY PANEL AND DISPLAY DEVICE

(71) Applicant: Xiamen Tianma Display Technology Co., Ltd., Xiamen (CN)

(72) Inventors: Fenxiang Zou, Xiamen (CN); Jieliang Li, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,645

(22) Filed: Jan. 24, 2023

(65) Prior Publication Data

US 2023/0162658 A1 May 25, 2023

Related U.S. Application Data

(63) Continuation of application No. 17/646,584, filed on Dec. 30, 2021, now Pat. No. 11,580,895.

(30) Foreign Application Priority Data

Sep. 10, 2021 (CN) ......................... 202111063932.7

(51) Int. Cl.
*G09G 3/32* (2016.01)

(52) U.S. Cl.
CPC ....... *G09G 3/32* (2013.01); *G09G 2300/0426* (2013.01); *G09G 2310/0267* (2013.01); *G09G 2310/0286* (2013.01)

(58) Field of Classification Search
CPC .............. H01L 27/3276; G09G 3/3266; G09G 3/3674-3681; G09G 2300/00408; G09G 2310/0286; G09G 2310/026
See application file for complete search history.

(56) References Cited

U.S. PATENT DOCUMENTS

| | | | | |
|---|---|---|---|---|
| 9,276,017 | B2 * | 3/2016 | Lee | G02F 1/1368 |
| 10,177,172 | B2 * | 1/2019 | Wu | G09G 3/3677 |
| 10,586,495 | B2 * | 3/2020 | Kobayashi | G09G 3/2003 |
| 11,164,532 | B2 * | 11/2021 | Kwon | G09G 3/3233 |

(Continued)

FOREIGN PATENT DOCUMENTS

| | | |
|---|---|---|
| CN | 108630144 A | 10/2018 |
| CN | 111091776 A | 5/2020 |

*Primary Examiner* — Patrick F Marinelli

(74) *Attorney, Agent, or Firm* — Anova Law Group, PLLC

(57) ABSTRACT

A display panel. The display panel includes a base substrate, drive circuits, pixel circuits, and signal line groups. The drive circuits and the pixel circuits are arranged on the base substrate. The drive circuits provide control signals for the pixel circuits. The pixel circuits provide drive currents for light-emitting elements of the display panel. The drive circuits include a first drive circuit and a second drive circuit. The signal line groups include a first signal line group and a second signal line group. The first signal line group includes M signal lines that provide signals for the first drive circuit. The second signal line group includes N signal lines that provide signals for the second drive circuit, M≥1, and N≥1. The first drive circuit includes S1 level shift registers extending along a first direction. The second drive circuit includes S2 level shift registers extending along the first direction.

20 Claims, 21 Drawing Sheets

(56) References Cited

U.S. PATENT DOCUMENTS

| | | | | |
|---|---|---|---|---|
| 11,194,414 | B2 * | 12/2021 | Lee | H10K 50/865 |
| 11,314,349 | B2 * | 4/2022 | Lee | G06F 3/0445 |
| 2015/0187810 | A1 * | 7/2015 | Lee | G02F 1/1368 257/40 |
| 2017/0345845 | A1 * | 11/2017 | Wu | H01L 27/124 |
| 2018/0026218 | A1 * | 1/2018 | Kobayashi | G09G 3/3648 349/143 |
| 2021/0026477 | A1 * | 1/2021 | Lee | H10K 50/865 |
| 2021/0026478 | A1 * | 1/2021 | Lee | G09G 3/3225 |
| 2021/0193764 | A1 * | 6/2021 | Cho | H01L 27/1225 |
| 2021/0202683 | A1 * | 7/2021 | Lee | H10K 59/131 |
| 2021/0225980 | A1 * | 7/2021 | Xu | H10K 59/131 |
| 2021/0295780 | A1 * | 9/2021 | Ikeda | H01L 29/7869 |
| 2021/0335754 | A1 * | 10/2021 | Zhu | G02F 1/1339 |
| 2022/0057912 | A1 * | 2/2022 | Yang | G09F 9/30 |
| 2022/0077273 | A1 * | 3/2022 | Qing | H01L 27/0248 |
| 2022/0122546 | A1 * | 4/2022 | Long | G09G 3/3291 |
| 2022/0123087 | A1 * | 4/2022 | Yu | H10K 59/131 |
| 2022/0165202 | A1 * | 5/2022 | Chen | G09G 3/2092 |
| 2023/0162658 | A1 * | 5/2023 | Zou | G09G 3/20 |

* cited by examiner

DISPLAY PANEL AND DISPLAY DEVICE

CROSS-REFERENCE TO RELATED APPLICATION

This application is a continuation of application Ser. No. 17/646,584, filed on Dec. 30, 2021, which claims the priority of Chinese patent application No. 202111063932.7, filed on Sep. 10, 2021, the entirety of all of which is incorporated herein by reference.

TECHNICAL FIELD

The present disclosure generally relates to the field of display technology and, more particularly, relates to a display panel and a display device.

BACKGROUND

The frame region of the existing display device includes a peripheral drive circuit for providing drive signals for pixel units in the display region. In the display device, a plurality of pixel units is arranged in the display region, and each pixel unit includes a pixel circuit. All pixel circuits are electrically connected to the peripheral drive circuit at the frame region respectively, and the peripheral drive circuit provides the pixel circuits with scan control signals and light-emitting control signals, thereby controlling the pixel circuits to provide drive currents for light-emitting elements. However, the existing drive circuit may occupy a relatively large space, such that it is difficult to reduce the frame width of the display device.

SUMMARY

One aspect of the present disclosure provides a display panel. The display panel includes a base substrate, drive circuits, pixel circuits, and line groups. The drive circuits and the pixel circuits are arranged on the base substrate. The drive circuits provide control signals for the pixel circuits. The pixel circuits provide drive currents for light-emitting elements of the display panel. The drive circuits include a first drive circuit and a second drive circuit. The signal line groups include a first signal line group and a second signal line group. The first signal line group includes M signal lines that provide signals for the first drive circuit. The second signal line group includes N signal lines that provide signals for the second drive circuit, M≥1, and N≥1. In a direction perpendicular to a surface of the display panel, M0 signal lines of the first signal line group overlap with the first drive circuit and are located on a side of the first drive circuit away from the base substrate. N0 signal lines of the second signal line group overlap with the second drive circuit and are located on a side of the second drive circuit away from the base substrate, 1≤M0≤M, and 1≤N0≤N. The first drive circuit includes S1 level shift registers extending along a first direction, and/or the second drive circuit includes S2 level shift registers extending along the first direction. A second direction is in parallel with a plane of the surface of the display panel and perpendicular to the first direction, S1≥2, and S2≥2. The first drive circuit provides a light-emitting control signal for a light-emitting control transistor of the pixel circuit. The second drive circuit provides a control signal for a PMOS transistor of the pixel circuit, or the second drive circuit provides a control signal for an NMOS transistor of the pixel circuit. An i-th signal line of the M0 signal lines and a j-th signal line of N0 signal lines are signal lines that transmit a same functional signal. Along the second direction, a width of the i-th signal line is Di, a width of the j-th signal line is Dj, and Dj>Di.

Another aspect of the present disclosure provides a display panel. The display panel includes a base substrate, drive circuits, pixel circuits, and signal line groups. The drive circuits and the pixel circuits are arranged on the base substrate. The drive circuits provide control signals for the pixel circuits. The pixel circuits provide drive currents for light-emitting elements of the display panel. The drive circuits include a first drive circuit and a second drive circuit. The signal line groups include a first signal line group and a second signal line group. The first signal line group includes M signal lines that provide signals for the first drive circuit. The second signal line group includes N signal lines that provide signals for the second drive circuit, M≥1, and N≥1. In a direction perpendicular to a surface of the display panel, M0 signal lines of the first signal line group overlap with the first drive circuit and are located on a side of the first drive circuit away from the base substrate. N0 signal lines of the second signal line group overlap with the second drive circuit and are located on a side of the second drive circuit away from the base substrate, 1≤M0≤M, and 1≤N0≤N. The first drive circuit includes S1 level shift registers extending along a first direction, and/or the second drive circuit includes S2 level shift registers extending along the first direction. A second direction is in parallel with a plane of the surface of the display panel and perpendicular to the first direction, S1≥2, and S2≥2. An i-th signal line of the M0 signal lines and a j-th signal line of the N0 signal lines are signal lines that transmit a same signal. Along the second direction, a width of the i-th signal line is Di, a width of the j-th signal line is Dj, and Dj>Di.

Another aspect of the present disclosure provides a display device including a display panel. The display panel includes a base substrate, drive circuits, pixel circuits, and line groups. The drive circuits and the pixel circuits are arranged on the base substrate. The drive circuits provide control signals for the pixel circuits. The pixel circuits provide drive currents for light-emitting elements of the display panel. The drive circuits include a first drive circuit and a second drive circuit. The signal line groups include a first signal line group and a second signal line group. The first signal line group includes M signal lines that provide signals for the first drive circuit. The second signal line group includes N signal lines that provide signals for the second drive circuit, M≥1, and N≥1. In a direction perpendicular to a surface of the display panel, M0 signal lines of the first signal line group overlap with the first drive circuit and are located on a side of the first drive circuit away from the base substrate. N0 signal lines of the second signal line group overlap with the second drive circuit and are located on a side of the second drive circuit away from the base substrate, 1≤M0≤M, and 1≤N0≤N. The first drive circuit includes S1 level shift registers extending along a first direction, and/or the second drive circuit includes S2 level shift registers extending along the first direction. A second direction is in parallel with a plane of the surface of the display panel and perpendicular to the first direction, S1≥2, and S2≥2. The first drive circuit provides a light-emitting control signal for a light-emitting control transistor of the pixel circuit. The second drive circuit provides a control signal for a PMOS transistor of the pixel circuit, or the second drive circuit provides a control signal for an NMOS transistor of the pixel circuit. An i-th signal line of the M0 signal lines and a j-th signal line of N0 signal lines are signal lines that transmit a same functional signal. Along the second direction, a width of the i-th signal line is Di, a width of the j-th signal line is Dj, and Dj>Di.

Other aspects of the present disclosure can be understood by those skilled in the art in light of the description, the claims, and the drawings of the present disclosure.

Compared with the existing technology, the display panel and the display device provided by the present disclosure may achieve at least the following beneficial effects.

BRIEF DESCRIPTION OF THE DRAWINGS

In order to more clearly explain various embodiments of the present disclosure, the drawings required for describing the embodiments or the existing technology are briefly introduced hereinafter. Obviously, the drawings in the following description are merely some embodiments of the present disclosure. Other drawings may also be obtained by those skilled in the art without any creative work according to provided drawings.

DETAILED DESCRIPTION

Various embodiments of the present disclosure are described clearly and completely in conjunction with the drawings in various embodiments of the present disclosure. Obviously, described embodiments are only a part of various embodiments of the present disclosure, rather than all embodiments. Based on various embodiments in the present disclosure, all other embodiments obtained by those skilled in the art without creative work shall fall within the protection scope of the present disclosure.

As described above, the frame region of the existing display device includes a peripheral drive circuit for providing drive signals for pixel units in the display region. In the display device, a plurality of pixel units is arranged in the display region, and each pixel unit includes a pixel circuit. All pixel circuits are electrically connected to the peripheral drive circuit at the frame region respectively, and the peripheral drive circuit provides the pixel circuits with scan control signals and light-emitting control signals, thereby controlling the pixel circuits to provide drive currents for light-emitting elements. However, the existing drive circuit may occupy a relatively large space, such that it is difficult to reduce the frame width of the display device.

Various embodiments of the present disclosure provide a display panel and a display device, which may effectively solve the technical problems existing in the existing technology and ensure that the frame width of the display device is relatively small.

In order to achieve the above-mentioned objectives, the technical solutions provided by various embodiments of the present disclosure are described in detail with reference to FIGS. 1-21.

Figure 1:
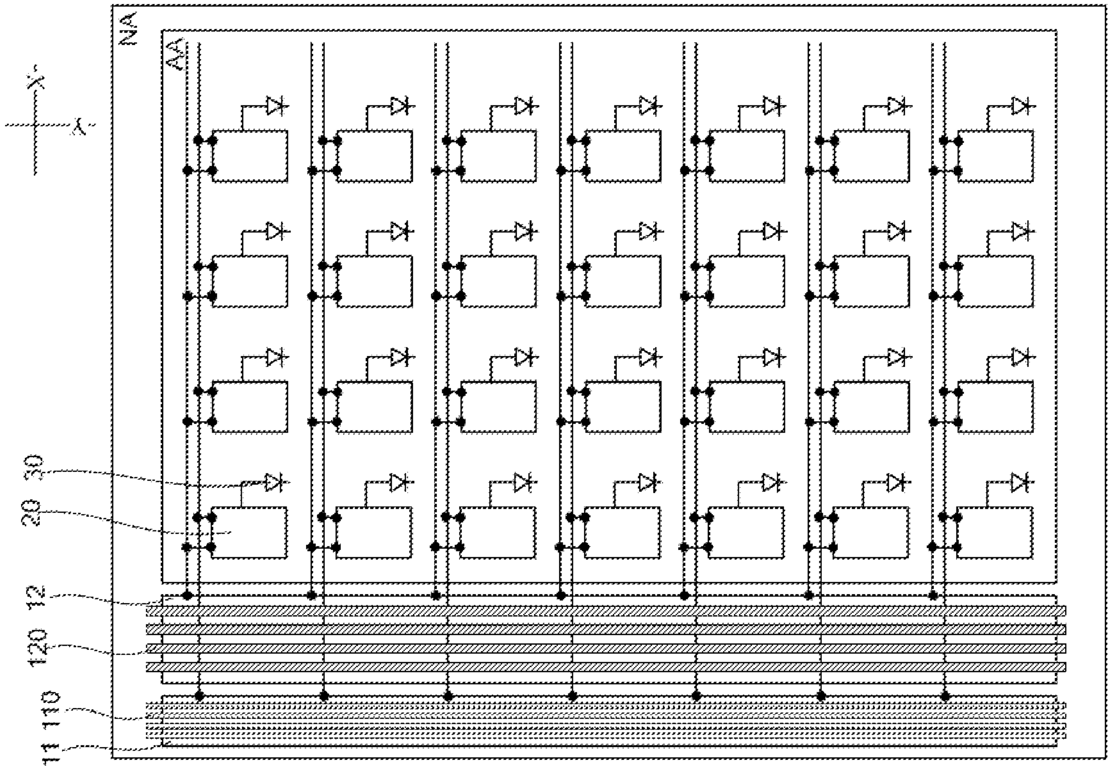
FIG. 1 illustrates a structural schematic of a display panel according to various embodiments of the present disclosure.

Referring to FIG. 1, FIG. 1 illustrates a structural schematic of a display panel according to various embodiments of the present disclosure. The display panel may include drive circuits and pixel circuits 20. The drive circuit may provide a control signal for the pixel circuit 20; and the pixel circuit 20 may provide a drive current for a light-emitting element 30 of the display panel.

The display panel may include a display region AA and a frame region NA. The pixel circuits 20 and the light-emitting elements 30 may be disposed in the display region AA, and the drive circuits may be disposed in the frame region NA. The drive circuits may include the first drive circuit 11 and the second drive circuit 12.

The drive circuits may be at the frame region NA. The display panel may include signal line groups, and the signal line groups may include the first signal line group and the second signal line group. The first signal line group may include M signal lines that provide signals for the first drive circuit 11, the second signal line group may include N signal lines that provide signals for the second drive circuit 12, M≥1, and N≥1. In addition, along the direction perpendicular to the surface of the display panel (i.e., along the direction perpendicular to the light-exiting direction of the display panel), M0 signal lines 110 in the first signal line group may overlap the first drive circuit 11, N0 signal lines 120 in the second signal line group may overlap the second drive circuit 12, 1≤M0≤M, and 1≤N0≤N.

The first drive circuit 11 may include S1 level shift registers extending along the first direction Y, the second drive circuit 12 may include S2 level shift registers extending along the first direction Y, and the first drive circuit 11 and the second drive circuit 12 may be arranged along the second direction X. The second direction X may be in parallel with the plane of the surface of the display panel and perpendicular to the first direction Y, S1≥2, and S2≥2.

Along the second direction X, the width of the first drive circuit 11 is W1, the width of the second drive circuit 12 is W2, the total width of the M0 signal lines 110 in the first signal line group is D1, the total width of the N0 signal lines 120 in the second signal line group is D2, W2>W1, D2>D1, and D2/W2>D1/W1.

It can be understood that the M0 signal lines may overlap the first drive circuit and the N0 signal lines may overlap the second drive circuit, where the extension direction of the M0 signal lines and the extension direction of the N0 signal lines may be the first direction, which may reduce the area occupied by a part of the signal lines and reduce the frame width of the display device.

Along the second direction, when the widths of the drive circuits and the widths of the signal lines are wider, the frame of the display panel becomes larger. In order to reduce the frame, the signal lines and the drive circuits may normally be configured to be overlapped with each other to reduce the frame. When there are more than one set of drive circuits in the frame, how to configure the frame to sufficiently reduce the frame may be a problem. In order to solve the above-mentioned problem, the inventor of the present application found that when W2>W1, D2>D1, by setting D2/W2>D1/W1, the width of the signal line overlapped by the drive circuit with a relatively large width may also be relatively large. In such way, the width occupied by the drive circuit with a relatively large width and its connected signal line on the display panel may be sufficiently reduced, and the drive circuit with a relatively large width and the drive circuit with a relatively small width may achieve a desirable overlapping relationship with their respective signal lines to sufficiently reduce the frame. Therefore, in various embodiments of the present disclosure, the relationship between the width W1 of the first drive circuit, the width W2 of the second drive circuit, the total width D1 of the M0 signal lines and the total width D2 of the N0 signal lines may be configured as W2>W1, D2>D1, and D2/W2>D1/W1. The overlapping configuration of each of the shift register with a relatively large width and the shift register with a relatively small width and the total width of the respective corresponding signal line may be further optimized, the occupied area of the drive circuit and the signal lines may be sufficiently reduced, and the frame width of the display device may be further reduced.

Figure 2:
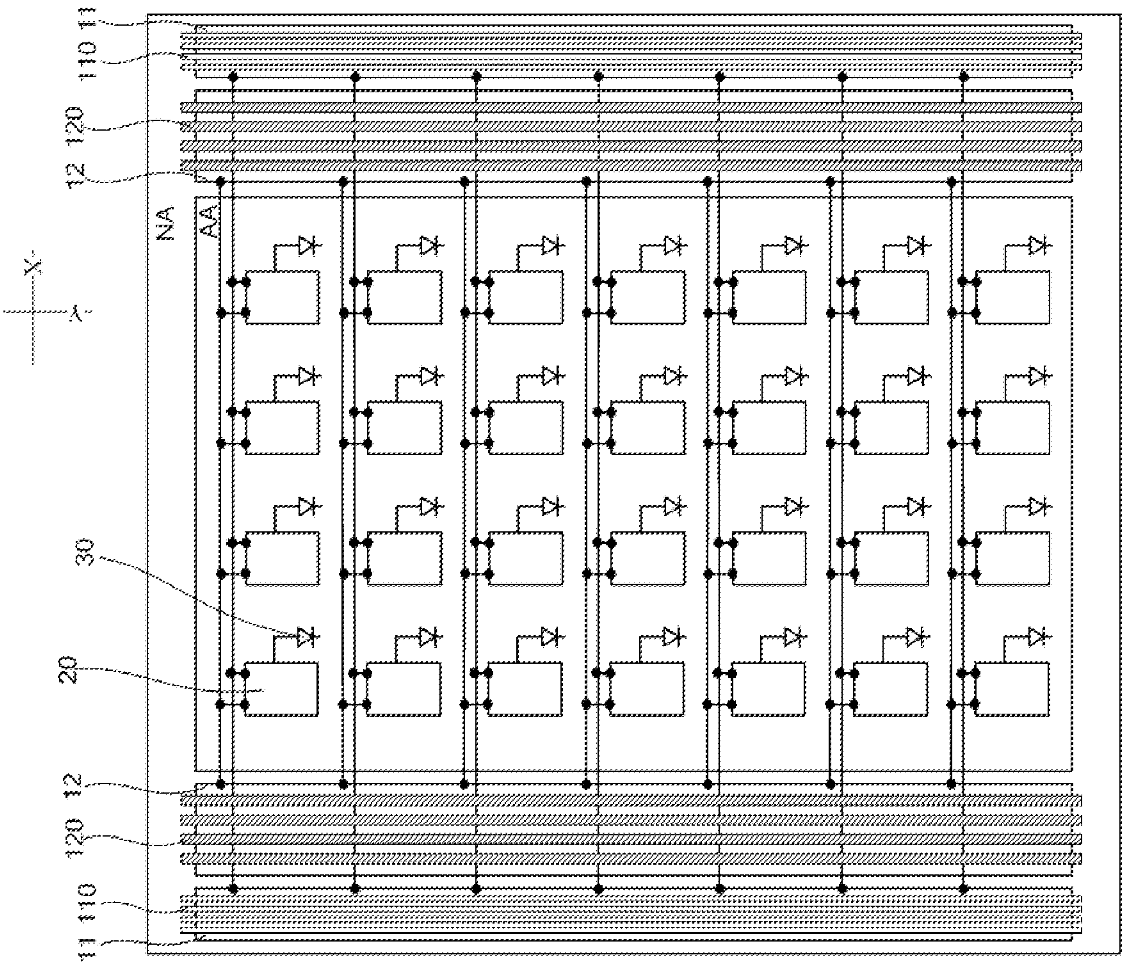
FIG. 2 illustrates a structural schematic of another display panel according to various embodiments of the present disclosure.

In one embodiment of the present disclosure, the display panel provided by the present disclosure may be a single-sided drive panel structure. As shown in FIG. 1, the first drive circuit 11 and the second drive circuit 12 of the drive circuits may be located on one side of the display region AA, and the pixel circuits 20 may be driven by the single-side drive circuits. Or, the display panel provided by the present disclosure may also be a double-sided drive panel structure. As shown in FIG. 2, the drive circuits may include the first drive circuits 11 located on both sides of the display region AA and the second drive circuits 12 located on both sides of the display region AA, such that the pixel circuit 20 may be driven by the double-sided drive circuits.

As shown in FIG. 2, for the double-sided drive panel structure provided by various embodiments of the present disclosure, the pixel circuits 20 in a same row may be simultaneously driven by two first drive circuits 11 located on different sides of the display region AA; and the pixel circuits 20 in a same row may be simultaneously driven by two second drive circuits 12 located on different sides of the display region AA.

It can be understood that the first drive circuits on different sides of the display region (defined as the first drive circuit on the first side and the first drive circuit on the second side) may each include a plurality of cascaded shift registers; the level one shift register of the first drive circuit on the first side and the level one shift register of the first drive circuit on the second side may be both electrically connected to the pixel circuits of the first row; the level two shift register of the first drive circuit on the first side and the level two shift register of the first drive circuit on the second side may be both electrically connected to the pixel circuits of the second row, and so on; and the last level shift register of the first drive circuit on the first side and the last level shift register of the first drive circuit on the second side may be both electrically connected to the pixel circuits of the last row. Similarly, the second drive circuits on different sides of the display region (defined as the second drive circuit on the first side and the second drive circuit on the second side) may each include a plurality of cascaded shift registers; the level one shift register of the second drive circuit on the first side and the level one shift register of the second drive circuit on the second side may be both electrically connected to the pixel circuits of the first row; the level two shift register of the second drive circuit on the first side and the level two shift register of the second drive circuit on the second side may be both electrically connected to the pixel circuits of the second row, and so on; and the last level shift register of the second drive circuit on the first side and the last level shift register of the second drive circuit on the second side may be both electrically connected to the pixel circuits of the last row.

Figure 3:
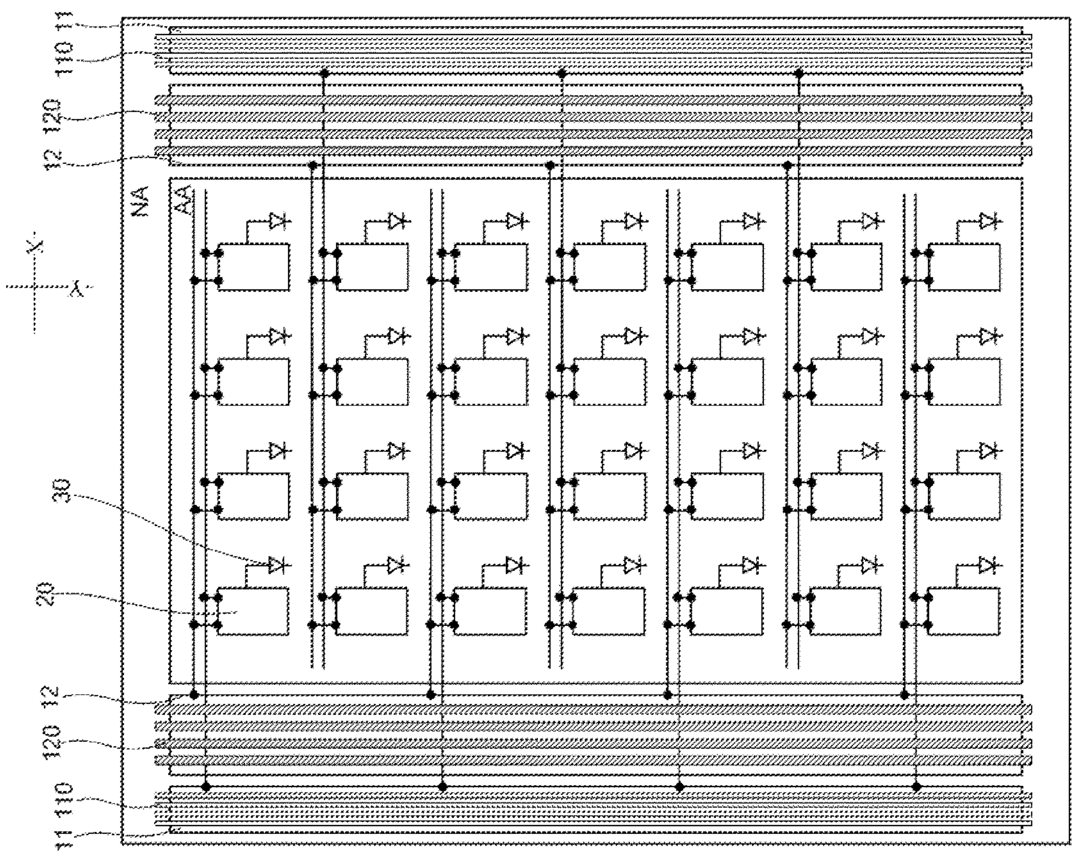
FIG. 3 illustrates a structural schematic of another display panel according to various embodiments of the present disclosure.

Or, as shown in FIG. 3, for the double-sided driven panel structure provided by various embodiments of the present disclosure, the pixel circuits 20 in different rows may be respectively driven by two first drive circuits 11 located on different sides of the display region AA; and the pixel circuits 20 in different rows may be respectively driven by two second drive circuits 12 located on different sides of the display region AA.

It can be understood that the first drive circuits at odd-numbered levels in the first drive circuits may be located on the first side of the display region, and the first drive circuits at even-numbered levels in the first drive circuits may be located on the second side of the display region, where the first drive circuits at odd-numbered levels may be correspondingly electrically connected to the pixel circuits at odd-numbered rows, and the first drive circuits at even-numbered levels may be correspondingly electrically connected to the pixel circuits at even-numbered rows. Similarly, the second drive circuits at odd-numbered levels in the second drive circuits may be located on the first side of the display region, and the second drive circuits at even-numbered levels in the second drive circuits may be located on the second side of the display region, where the second drive circuits at odd-numbered levels may be correspondingly electrically connected to the pixel circuits at odd-numbered rows, and the second drive circuits at even-numbered levels may be correspondingly electrically connected to the pixel circuits at even-numbered rows.

Figure 4:
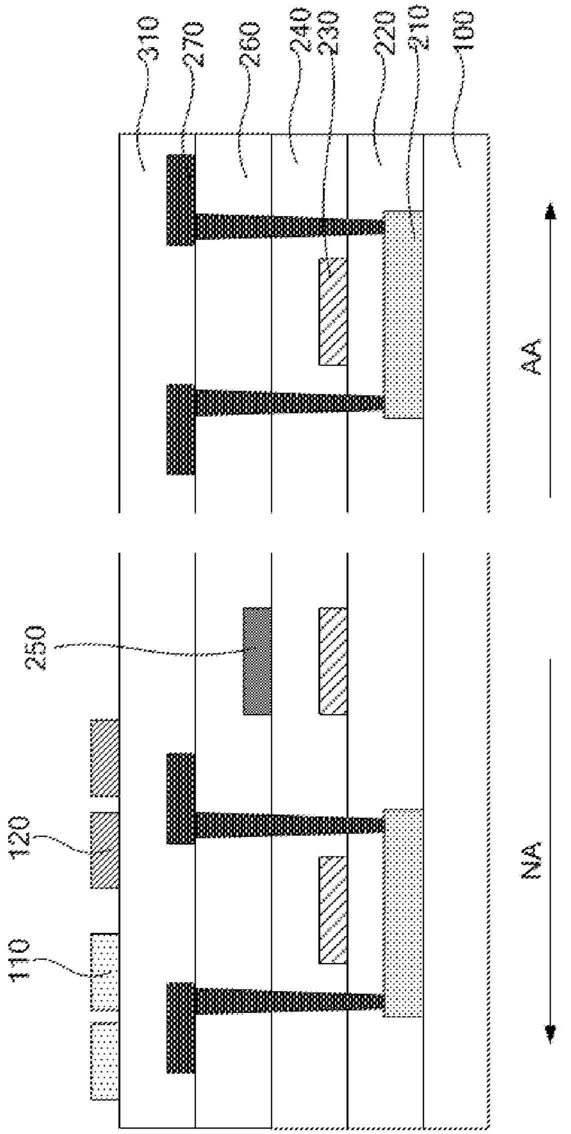
FIG. 4 illustrates a structural schematic of another display panel according to various embodiments of the present disclosure.

In one embodiment of the present disclosure, the display panel provided by the present disclosure may include a base substrate, and the drive circuits and the pixel circuits may be located on the base substrate; the M0 signal lines may be located on the side of the first drive circuits away from the base substrate; the N0 signal lines may be located on the side of the second drive circuits away from the base substrate; the M0 signal lines may be located on a same layer, and/or the N0 signal lines may be located on a same layer. As shown in FIG. 4, FIG. 4 illustrates a structural schematic of another display panel according to various embodiments of the present disclosure. The display panel may include a base substrate 100 and a transistor array layer located on the base substrate 100. The transistor array layer may include a semiconductor layer 210 on the base substrate 100, where the semiconductor layer 210 may include a plurality of active regions; a gate insulating layer 220 on the side of the semiconductor layer 210 away from the base substrate 100; a gate metal layer 230 located on the side of the gate insulating layer 220 away from the base substrate 100, where the gate metal layer 230 may include a plurality of gate electrodes and a plurality of first capacitor plates; an interlayer insulating layer 240 on the side of the gate metal layer 230 away from the base substrate 100; a capacitor metal layer 250 located on the side of the interlayer insulating layer 240 away from the base substrate 100, where the capacitor metal layer 250 may include a second capacitor plate arranged opposite to the first capacitor plate; an isolating layer 260 located on the side of the capacitor metal layer 250 away from the base substrate 100; a source/drain metal layer 270 on the side of the isolation layer 260 away from the base substrate 100, where the source/drain metal layer 270 may include a plurality of source electrodes and drain electrodes, the source electrodes and drain electrodes may be in contact with the active regions through respective vias, and the transistor array layer may include drive circuits and pixel circuits; and the first insulating layer 310 located on the side of the source/drain metal layer 270 away from the base substrate 100. The display panel may further include the M0 signal lines 110 located on the side of the first insulating layer 310 away from the base substrate 100, where the M0 signal lines 110 may be made of a same conductive layer. The display panel may further include the N0 signal lines 120 located on the side of the first insulating layer 310 away from the base substrate 100, where the N0 signal lines 120 may be made of a same conductive layer.

Figure 5:
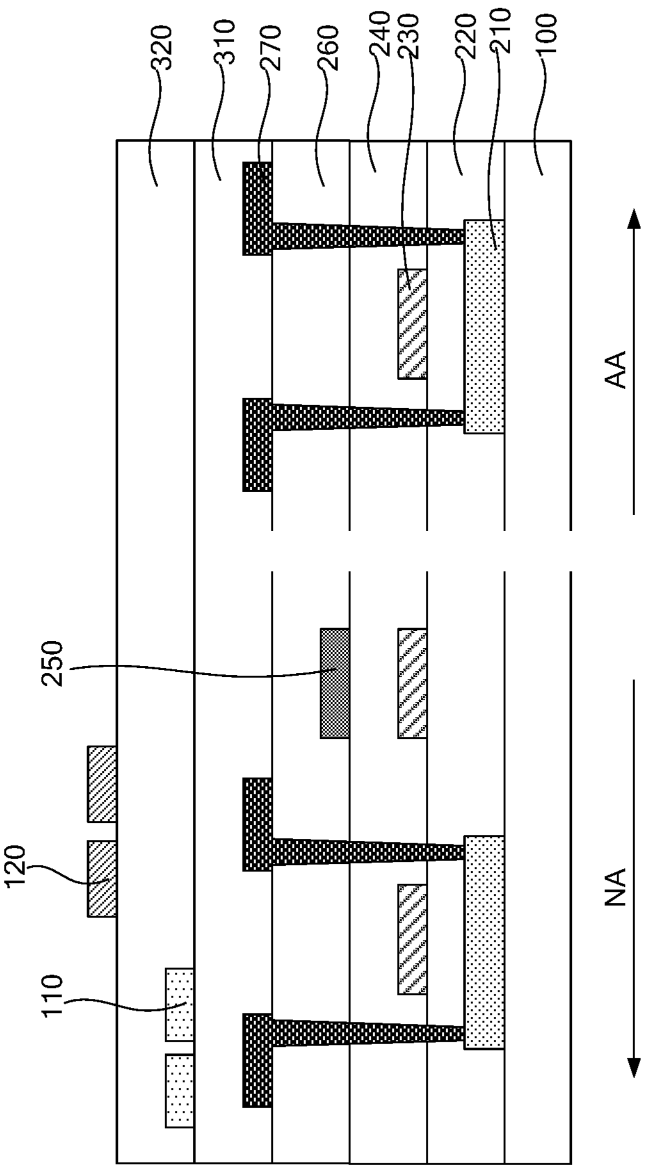
FIG. 5 illustrates a structural schematic of another display panel according to various embodiments of the present disclosure.

As shown in FIG. 4, the M0 signal lines 110 and the N0 signal lines 120 provided by various embodiments of the present disclosure may be made of a same conductive layer. That is, the M0 signal lines 110 and the N0 signal lines 120 may be located in a same layer. Or, as shown in FIG. 5, FIG. 5 illustrates a structural schematic of another display panel according to various embodiments of the present disclosure; and the M0 signal lines 110 and the N0 signal lines 120 provided by various embodiments of the present disclosure may be made of different conductive layers. That is, the second insulating layer 320 may be between the M0 signal lines 110 and the N0 signal lines 120, where the M0 signal lines 110 or the N0 signal lines 120 may be located on the side of the second insulating layer 320 adjacent to the first insulating layer 310, which may not be limited according to various embodiments of the present disclosure.

In one embodiment of the present disclosure, the widths of the signal lines and the drive circuits may be further optimized, and the width of the frame region of the display panel may be further optimized to realize the narrow frame. Along the second direction, the total width of the M signal lines is D11, and the total width of the N signal lines is D22, where [(W1−D11)−(W2−D22)]×[(D11−D1)−(D22−D2)]≤0.

It can be understood that, for the width of the first drive circuit W1, the width of the second drive circuit W2, the total width of the M signal lines D11, the total width of the M0 signal lines D1, the total width of the N signal lines D22, and the total width of the N0 signal lines D2 which are provided in various embodiments of the present disclosure, the relatively large value between (W1−D11) and (W2−D22) may indicate that the difference between the total width of the signal lines and the width of the corresponding drive circuit may be relatively large, and the total width of the signal lines may be smaller compared with the width of the corresponding drive circuit; and at this point, the region where the drive circuit is located may have more space for arranging signal lines that overlap the drive circuit. Furthermore, since the region of the corresponding drive circuit (the first drive circuit or second drive circuit) can overlap more signal lines, the drive circuit may correspond to the relatively small value of (D11−D1) and (D22−D2). Such configuration may fully save the frame region of the display panel, avoid unnecessary waste of space, and be beneficial for the narrow frame design. Optionally, (D11−D1)=(D22−D2)=0 may be provided in various embodiments of the present disclosure, that is, the M signal lines may all overlap the first drive circuit, and the N signal lines may all overlap the second drive circuit, which may reduce the width of the frame region of the display panel to the greatest extent and ensure narrower frame of the display panel.

Figure 6:
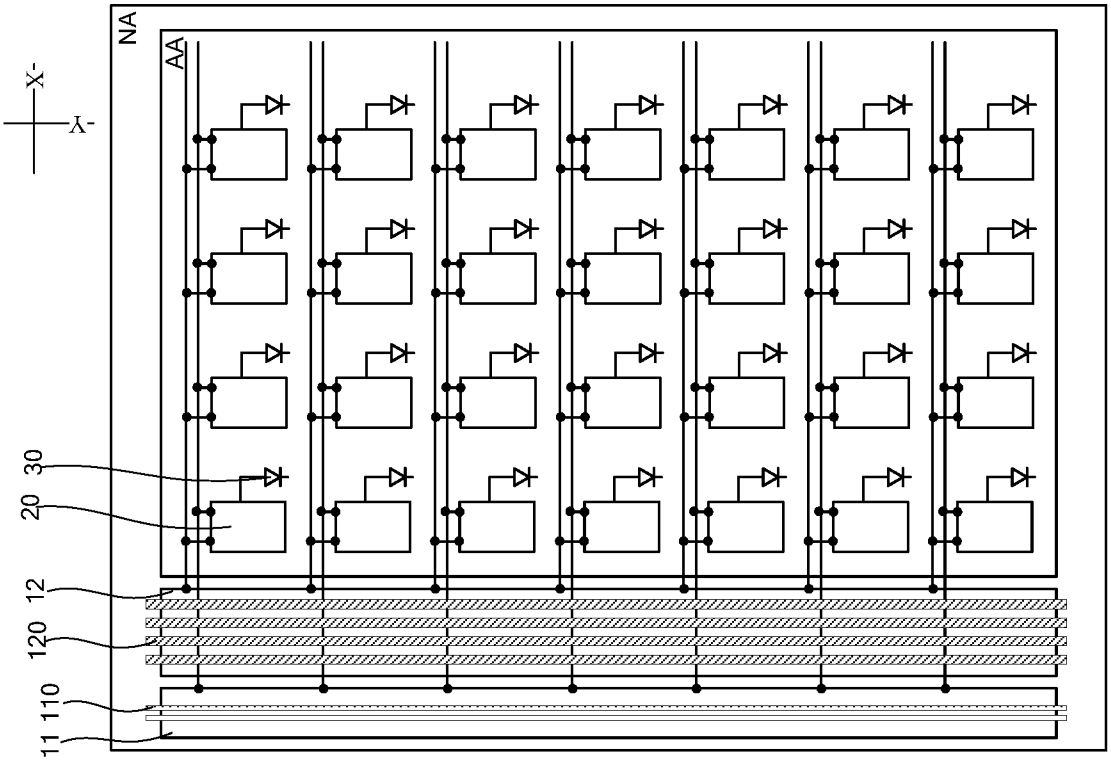
FIG. 6 illustrates a structural schematic of another display panel according to various embodiments of the present disclosure.

As shown in FIG. 6, FIG. 6 illustrates a structural schematic of another display panel according to various embodiments of the present disclosure. The relationship between the quantity of N0 signal lines 120 and the quantity of M0 signal lines 110 provided in various embodiments of the present disclosure may be N0−M0≥1.

It can be understood that, in various embodiments of the present disclosure, the relationship between the width W1 of the first drive circuit, the width W2 of the second drive circuit, the total width D1 of the M0 signal lines and the total width D2 of the N0 signal lines may be W2>W1, D2>D1, and D2/W2>D1/W1. Therefore, the quantity of overlapping N0 signal lines with the second drive circuit may be more by configuring the relationship between the quantity of N0 signal lines and the quantity of M0 signal lines to be N0−M0≥1, which may achieve the objective of reducing the frame region width.

Figure 7:
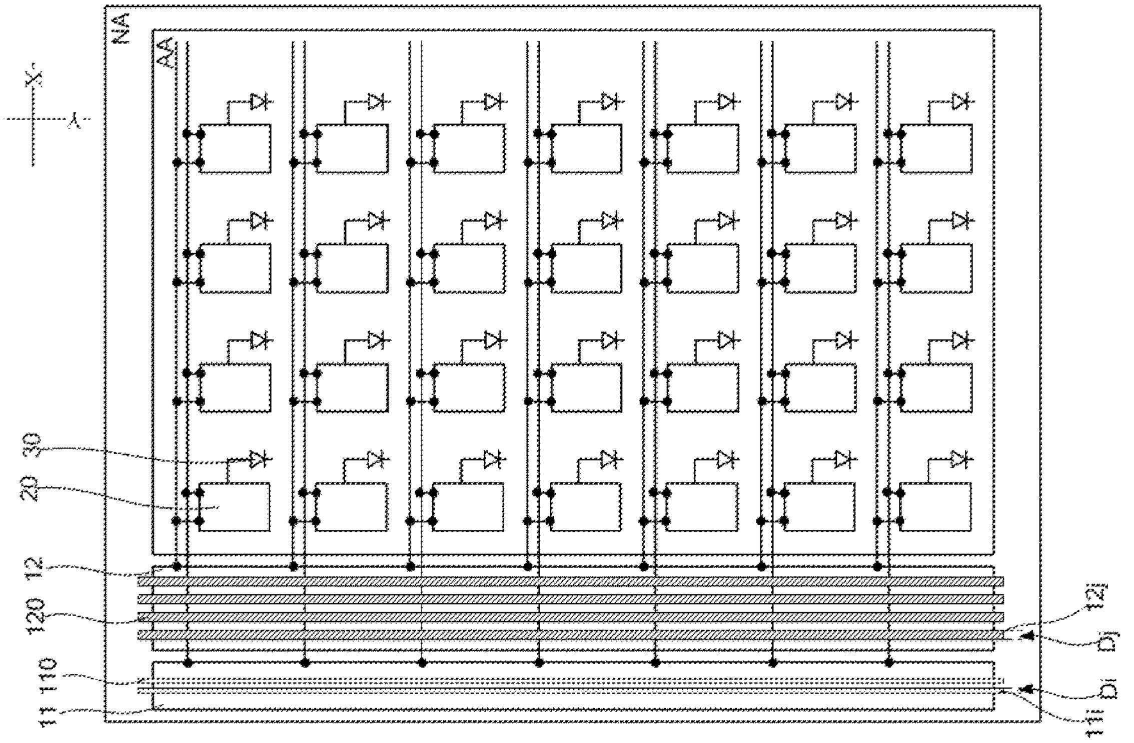
FIG. 7 illustrates a structural schematic of another display panel according to various embodiments of the present disclosure.

As shown in FIG. 7, FIG. 7 illustrates a structural schematic of another display panel according to various embodiments of the present disclosure. The signal line i (i.e., 11*i*) in the M0 signal line 120 and the signal line j (i.e., 12*j*) in the N0 signal lines may be signal lines that transmit a same function signal; and along the second direction X, the width of the signal line i (i.e., 11*i*) is Di, and the width of the signal line j (i.e., 12*j*) is Dj, where Dj>Di. The signal line i may be any signal line in the M0 signal lines, and the signal line j may be any signal line in the N0 signal lines.

It should be noted that each of the signal line i and the signal line j provided in various embodiments of the present disclosure may be a single signal line, or a combination of multiple signal lines, which may not be limited in the present disclosure. When each of the signal line i and the signal line j is a combination of multiple signal lines, the width of each of the signal line i and the signal line j may be the total width of included signal lines.

It can be understood that the width W2 of the second drive circuit may be greater than the width W1 of the first drive circuit; compared with the transistors in the shift register of the first drive circuit, the transistors in the shift register of the second drive circuit may occupy a relatively large area; and the output requirement of the shift register in the second drive circuit may be higher in most cases. Therefore, in order to ensure the accuracy and stability of the transmission signal and output signal of the second drive circuit, the second drive circuit may need to be connected to wider signal lines to reduce the voltage drop on the signal lines, thereby avoiding large fluctuation in the signals transmitted on the signal lines. In the technical solutions provided by various embodiments of the present disclosure, the width W2 of the second drive circuit may be relatively large, and the signal line j with the relatively large width and the second drive circuit may be designed to be overlapped with each other along the light-exiting direction of the display panel, which, under the premise of ensuring normal output of the second drive circuit, may prevent the signal line j from affecting the width of the frame region of the display panel and ensure the relatively small width of the display panel.

In one embodiment of the present disclosure, the signal line i (i.e., 11*i*) and the signal line j (i.e., 12*j*) provided by the present disclosure may be both clock signal lines; the first drive circuit 11 may provide light-emitting control signals for the light-emitting control transistors of the pixel circuits 20; and the second drive circuit 12 may provide control signals for the p-channel metal-oxide semiconductor (PMOS)-type transistors in the pixel circuits 20, where Dj/W2>Di/W1.

Figure 8:
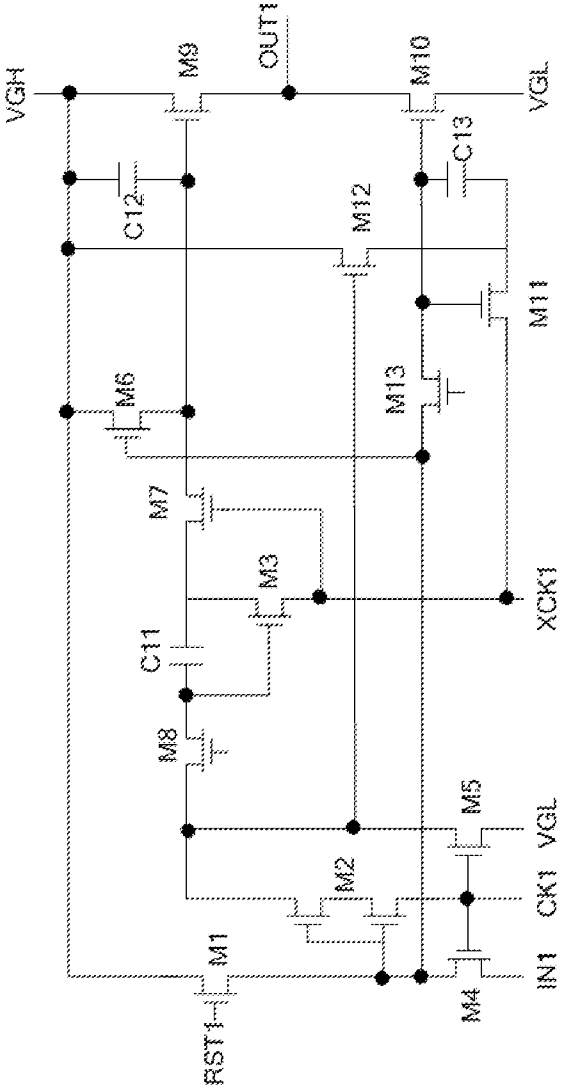
FIG. 8 illustrates a structural schematic of a shift register according to various embodiments of the present disclosure.
Figure 9:
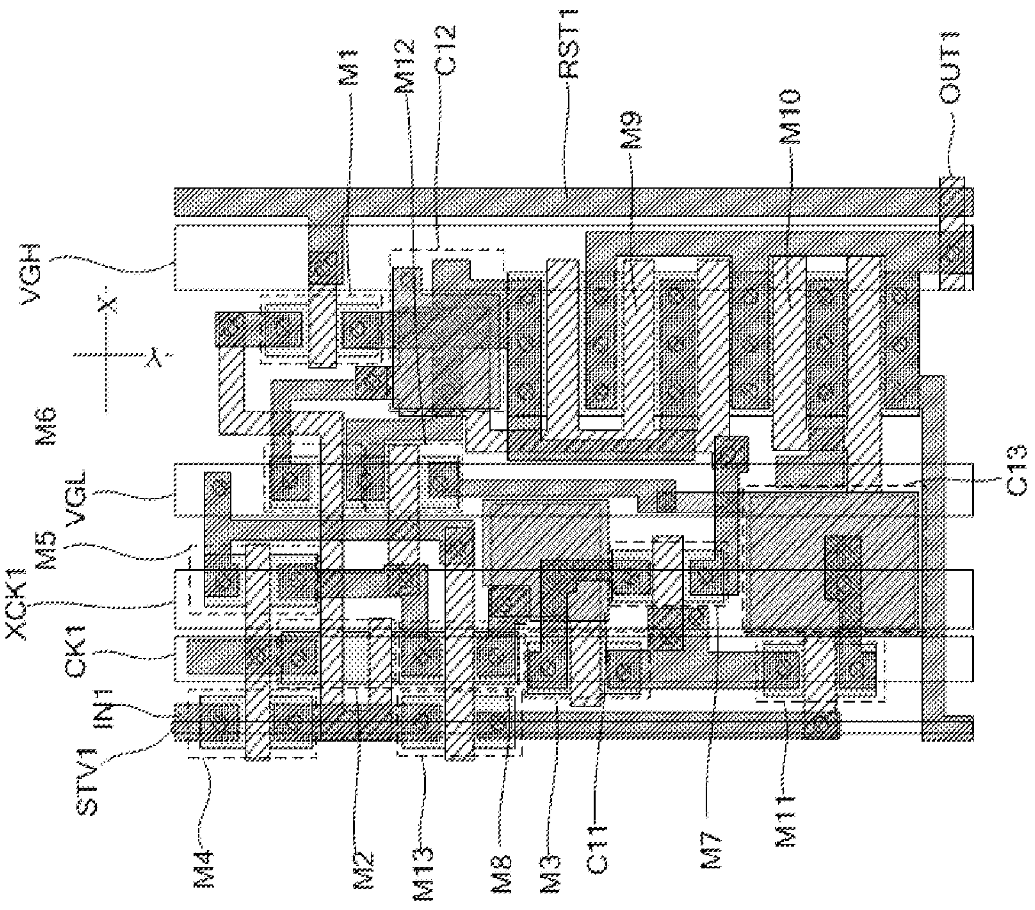
FIG. 9 illustrates a structural layout of the shift register shown in FIG. 8.

Referring to FIGS. 8-9, FIG. 8 illustrates a structural schematic of a shift register according to various embodiments of the present disclosure; and FIG. 9 illustrates a structural layout of the shift register shown in FIG. 8. FIG. 8 may be a structural schematic of the shift register in the first drive circuit. The shift register in the first drive circuit may include a first transistor M1, a second transistor M2, a third transistor M3, a fourth transistor M4, a fifth transistor M5, a sixth transistor M6, a seventh transistor M7, an eighth transistor M8, a nine transistor M9, a tenth transistor M10, an eleventh transistor M11, a twelfth transistor M12, a thirteenth transistor M13, a first capacitor C11, a second capacitor C12, and a third capacitor C13. The first signal line group may include a start signal line STV1 (where the start signal line STV1 provides an turn-on signal for the shift register at the end of the cascaded shift registers in the first drive circuit), a clock signal line CK1, a clock signal line XCK1 (the pulse signals transmitted by the clock signal line CK1 and the clock signal line XCK1 may be out of phase), a low-level voltage signal line VGL, and a high-level voltage signal line VGH. Signals may be provided for the shift register in the first drive circuit through the first signal line group; and furthermore, through the cooperation of the first transistor M1 to the thirteenth transistor M13 and the first capacitor C11 to the third capacitor C13, the shift register may finally output light-emitting control signals for controlling the operation of the light-emitting control transistors in the pixel circuit 20. The start signal line STV1, the clock signal line CK1, the clock signal line XCK1, the low-level voltage signal line VGL, and the high-level voltage signal line VGH provided by various embodiment of the present disclosure may all overlap the first drive circuit. That is, the M0 signal lines may include the start signal line STV1, the clock signal line CK1, the clock signal line XCK1, the low-level voltage signal line VGL, and the high-level voltage signal line VGH, which may ensure that the width of the frame region of the display panel is relatively small.

Figure 10:
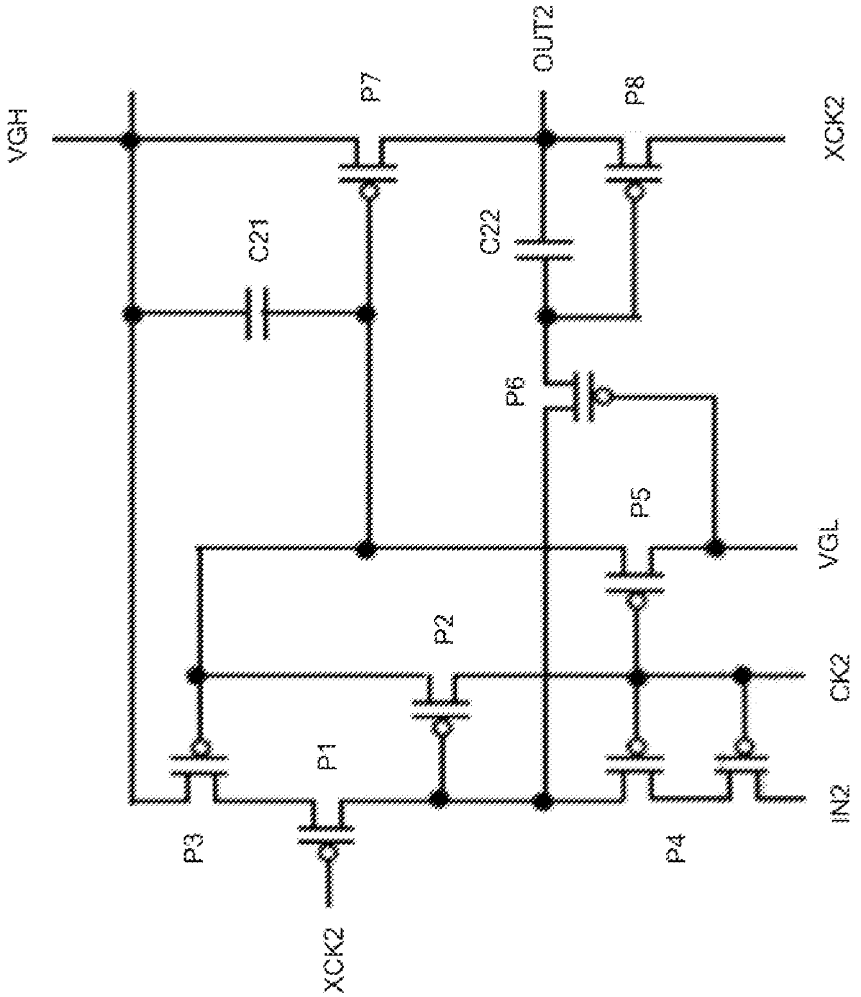
FIG. 10 illustrates a structural schematic of another shift register according to various embodiments of the present disclosure.
Figure 11:
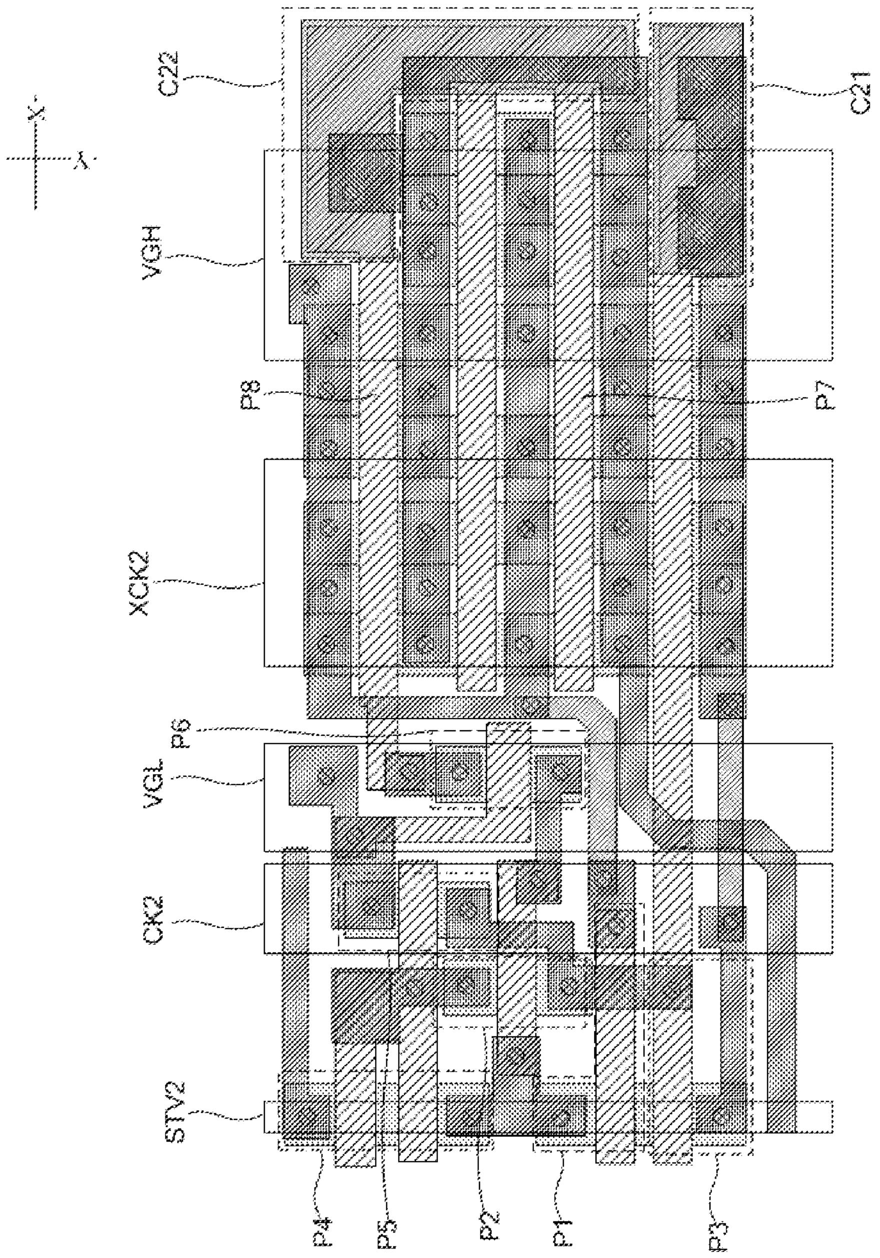
FIG. 11 illustrates a structural layout of the shift register shown in FIG. 10.

Referring to FIGS. 10-11, FIG. 10 illustrates a structural schematic of another shift register according to various embodiments of the present disclosure; and FIG. 11 illustrates a structural layout of the shift register shown in FIG. 10. FIG. 10 may be a structural schematic of the shift register in the second drive circuit. Optionally, the second drive circuit may be configured to control PMOS-type transistors in the pixel circuit. The shift register in the second drive circuit may include a first transistor P1, a second transistor P2, a third transistor P3, a fourth transistor P4, a fifth transistor. P5, a sixth transistor P6, a seventh transistor P7, an eighth transistor P8, a first capacitor C21, and a second capacitor C22. The second signal line group may include a start signal line STV2 (where the start signal line STV2 may provide a turn-on signal for the shift register at the end of the cascaded shift registers in the second drive circuit), a clock signal line CK2, a clock signal line XCK2, a low-level voltage signal line VGL, and a high-level voltage signal line VGH. Signals may be provided for the shift register in the second drive circuit through the second signal line group; and furthermore, through the cooperation of the first transistor P1 to the eighth transistor P8, the first capacitor C21 and the second capacitor C23, the shift register may finally output control signals for controlling the operation of the PMOS-type transistors in the pixel circuit 20. The start signal line STV2, the clock signal line CK2, the clock signal line XCK2 (the pulse signals transmitted by the clock signal line CK2 and the clock signal line XCK2 may be out of phase), the low-level voltage signal line VGL, and the high-level voltage signal line VGH provided by various embodiments of the present disclosure may all overlap the second drive circuit. That is, the No signal lines may include the start signal line STV2, the clock signal line CK2, the clock signal line XCK2, the low-level voltage signal line VGL, and the high-level voltage signal line VGH, which may ensure that the width of the frame region of the display panel is relatively small.

Referring to FIG. 11, the signal line j provided by various embodiments of the present disclosure may include a signal line j1 (i.e., CK2) and a signal line j2 (i.e., XCK2); along the second direction X, the signal line j2 (XCK2) may be located on the side of the signal line j1 (CK2) facing the display region AA of the display panel; the width of the signal line j1 (CK2) is Dj1, the width of the signal line j2 (XCK2) is Dj2, Dj2>Dj1, where Dj1≥Di and/or, Dj2≥Di. Optionally, Dj=Dj1+Dj2.

It can be understood that the signal line j provided by various embodiments of the present disclosure may be related to the output control and other related control processes of the second drive circuit. Therefore, the signal line j may be substantially configured as a combination of the signal line j1 and the signal line j2; and the signal line j2 may be configured on the side of the signal line j1 facing the display region. Moreover, the output terminal of the drive circuit may be normally configured on the side facing the display region, thereby being electrically connected to the pixel circuit in the display region; and the signal line j2 may be connected to the output module of the shift register. Therefore, the width of the signal line j2 may be designed to be relatively large to ensure the transmission stability of the signal accessed to the output module, and Dj2 may be designed to be greater than Dj1. In addition, based on above-mentioned configuration, the width relationship may also be configured as Dj1≥Di and/or Dj2≥Di, and furthermore, it may satisfy that the transmission stability of the signal accessed by the shift register of the second drive circuit with a relatively large width is high. Meanwhile, the width W2 of the second drive circuit provided by various embodiments of the present disclosure is larger, such that the wider signal line j may be configured to be overlapped with the second drive circuit, thereby achieving the narrow frame design.

In one embodiment of the present disclosure, the signal line i and the signal line j provided by the present disclosure may also be other types of signal lines. That is, the signal line i (11*i*) and the signal line j provided by the present disclosure may also be both high-level voltage signal lines or low-level voltage signal lines. The first drive circuit 11 may provide light-emitting control signals for the light-emitting control transistors of the pixel circuit 20. Optionally, the second drive circuit 12 may provide control signals for the n-channel metal-oxide semiconductor (NMOS)-type transistors in the pixel circuit 20, and the NMOS-type transistors may be connected to the gate electrodes of the drive transistors, where Dj/W2>Di/W1. The drive transistor may be a transistor used to provide a drive current in the pixel circuit 20, and the light-emitting element in the pixel circuit 20 may emit light in response to the drive current.

Figure 12:
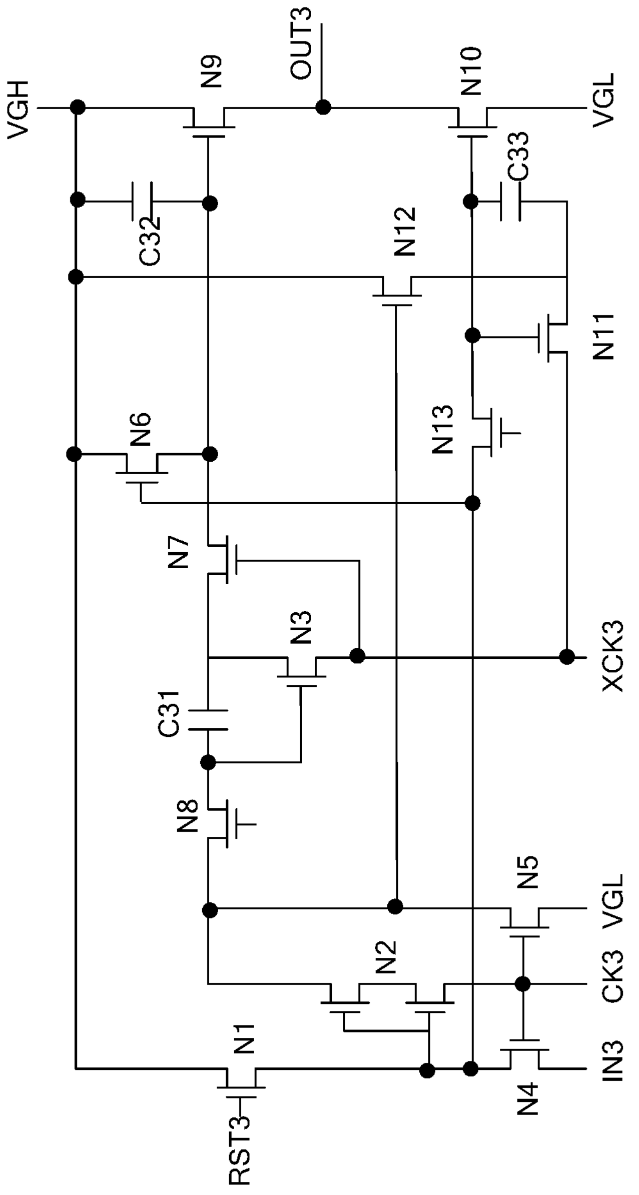
FIG. 12 illustrates a structural schematic of another shift register according to various embodiments of the present disclosure.
Figure 13:
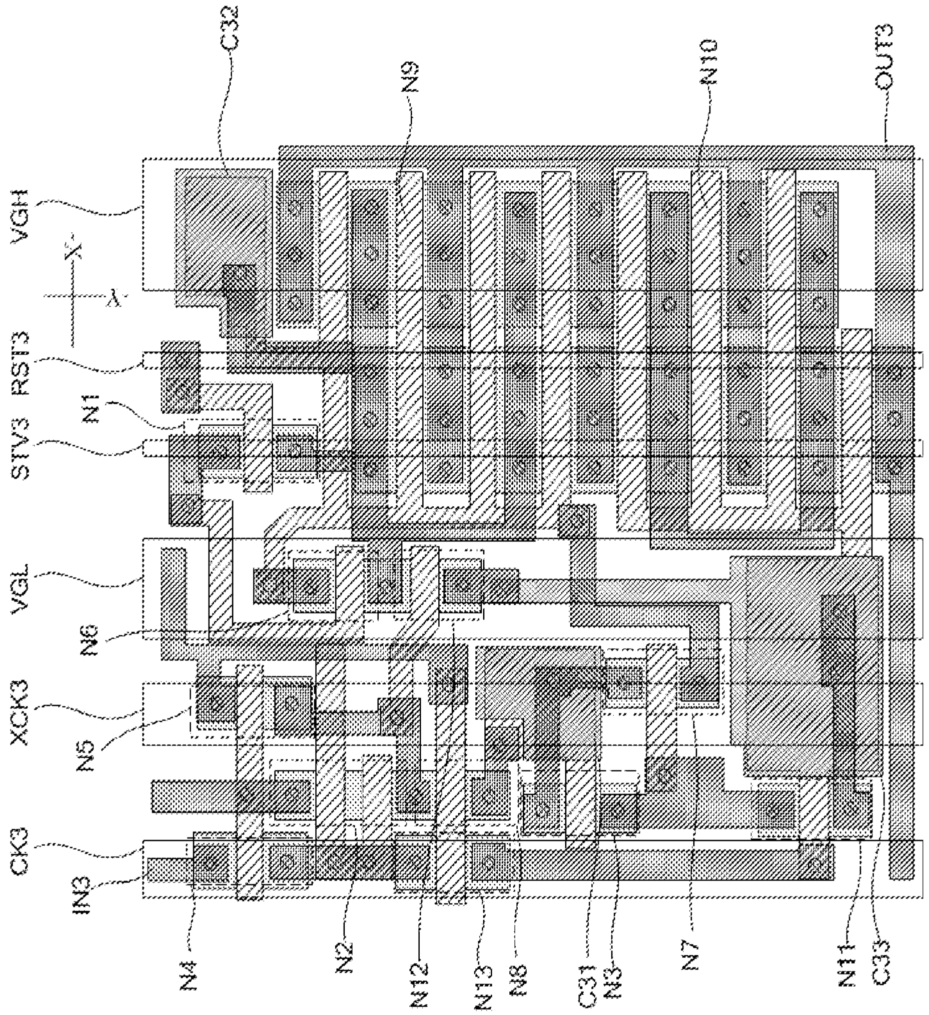
FIG. 13 illustrates a structural layout of the shift register shown in FIG. 12.

The shift register of the first drive circuit provided by various embodiments of the present disclosure may have the circuit structure of the shift register as shown in FIGS. 8-9. Referring to FIGS. 12-13, FIG. 12 illustrates a structural schematic of another shift register according to various embodiments of the present disclosure; and FIG. 13 illustrates a structural layout of the shift register shown in FIG. 12. FIG. 12 illustrates a structural schematic of the shift register in the second drive circuit. Optionally, the second drive circuit may be configured to control the NMOS-type transistors in the pixel circuit, where the shift register in the second drive circuit may include a first transistor N1, a second transistor N2, a third transistor N3, a fourth transistor N4, a fifth transistor N5, a sixth transistor N6, a seventh transistor N7, an eighth transistor N8, a nine transistors N9, a tenth transistor N10, an eleventh transistor N11, a twelfth transistor N12, a thirteenth transistor N13, a first capacitor C31, a second capacitor C32, and a third capacitor C33. The second signal line group may include a start signal line STV3 (where the start signal line STV3 may provide an turn-on signal for the shift register at the end of the cascaded shift registers in the second drive circuit), a clock signal line CK3, a clock signal line XCK3 (the pulse signals transmitted by the clock signal line CK3 and the clock signal line XCK3 may be out of phase), the low-level voltage signal line VGL, and the high-level voltage signal line VGH. Through providing, by the second signal line group, signals for the shift register in the second drive circuit and then through the cooperation of the first transistor N1 to the thirteenth transistor N13 and the first capacitor C31 to the third capacitor C33, the shift register may finally output control signals for controlling the operation of the NMOS-type transistors in the pixel circuit 20. The start signal line STV3, the clock signal line CK3, the clock signal line XCK3, the low-level voltage signal line VGL, and the high-level voltage signal line VGH provided in various embodiments of the present disclosure may all overlap the second drive circuit. That is, the N0 signal lines may include the start signal line STV3, the clock signal line CK3, the clock signal line XCK3, the low-level voltage signal line VGL, and the high-level voltage signal line VGH, which may ensure that the width of the frame region of the display panel is small.

Referring to FIGS. 8 and 12, when the signal line i and the signal line j are both the high-level voltage signal lines VGH or the low-level voltage signal lines VGL, in the shift register of the first drive circuit and the shift register of the second drive circuit, the output transistors of the shift register of the first drive circuit (the ninth transistor M9 and the tenth transistor M10) and the output transistors of the shift register of the second drive circuit (the ninth transistor N9 and the tenth transistor N10) may be connected to the high-level voltage signal lines VGH and the low level voltage signal lines VGL. The gate potential of the drive transistor in the pixel circuit is closely related to the magnitude of the drive current, such that the NMOS-type transistor connected to the gate electrode of the drive transistor may have higher requirement for the stability and leakage current of the NMOS-type transistor to ensure that the potential stability of the gate of the drive transistor is high. Therefore, in various embodiments of the present disclosure, by designing the width W2 of the second drive circuit to be relatively large, the output stability of the shift register in the second drive circuit may be higher. The width W2 of the second drive circuit is designed to be relatively large, the Dj parameter with a relatively large width may be designed, such that the objective of reducing the voltage drop of the transmission signal and ensuring the transmission signal stability may be finally achieved, the narrow frame design may be realized, and the width relationship may be further optimized as Dj/W2>Di/W1.

As shown in FIG. 13, the signal line j may include a signal line j1 (i.e., VGL) and a signal line j2 (i.e., VGH). Along the second direction X, the signal line j2 (VGH) may be located on the side of the signal line j1 (VGL) facing the display region AA of the display panel. The width of the signal line j1 (VGL) is Dj1, and the width of the signal line j2 (VGH) is Dj2, where Dj2>Dj1, Dj1≥Di and/or Dj2≥Di. Optionally, Dj=Dj1+Dj2.

It can be understood that the signal line j provided by various embodiments of the present disclosure may be related to the output and other related control processes of the second drive circuit. Therefore, the signal line j may be substantially configured as a combination of the signal line j1 and the signal line j2; and the signal line j2 may be configured on the side of the signal line j1 facing the display region. Moreover, the output terminal of the drive circuit may be on the side of the drive circuit facing the display region, thereby being electrically connected to the pixel circuit in the display region, and the signal line j2 may be connected to the output module of the shift register. Therefore, the width of the signal line j2 may be designed to be relatively large to ensure the transmission stability of the signal accessed by the output module, and Dj2 may be designed to be greater than Dj1. In addition, based on above-mentioned configuration, the width relationship may also be configured as Dj1≥Di and/or Dj2≥Di, and furthermore, it may satisfy that the transmission stability of the signal accessed by the shift register of the second drive circuit with relatively large width is high. Meanwhile, the width W2 of the second drive circuit provided by various embodiments of the present disclosure is larger, such that the wider signal line j may be configured to be overlapped with the second drive circuit, thereby achieving the narrow frame design.

In one embodiment of the present disclosure, the level one shift register of the first drive circuit provided by the present disclosure may include x1 transistors and y1 capacitors, x1≥1, and y1≥1; the level one shift register of the second drive circuit may include x2 transistors and y2 capacitors, x1≥1, and y2≥1; at least one of the M0 signal lines may overlap at least one of the x1 transistors, and may not overlap any one of the y1 capacitors; and/or at least one of the N0 signal lines may overlap at least one of the x2 transistors, and may not overlap any one of the y2 capacitors.

It can be understood that the signal line may be configured to transmit signals. When the signal line overlaps the capacitor, it is equivalent to connecting a new capacitor to the original capacitor which in turn causes the capacitance value to change. It may not only affect the capacitor, but also affect the signal transmission stability on the signal line. Therefore, the shift register in the first drive circuit and the shift register in the second drive circuit provided by various embodiments of the present disclosure may both include a plurality of transistors and at least one capacitor; and in the signal lines that overlap the drive circuits (the first drive circuit and/or the second drive circuit), at least one signal line may only overlap the transistor and may not overlap the capacitor, which may ensure both the signal transmission stability on the signal line and the capacitor reliability in the drive circuit.

Figure 14:
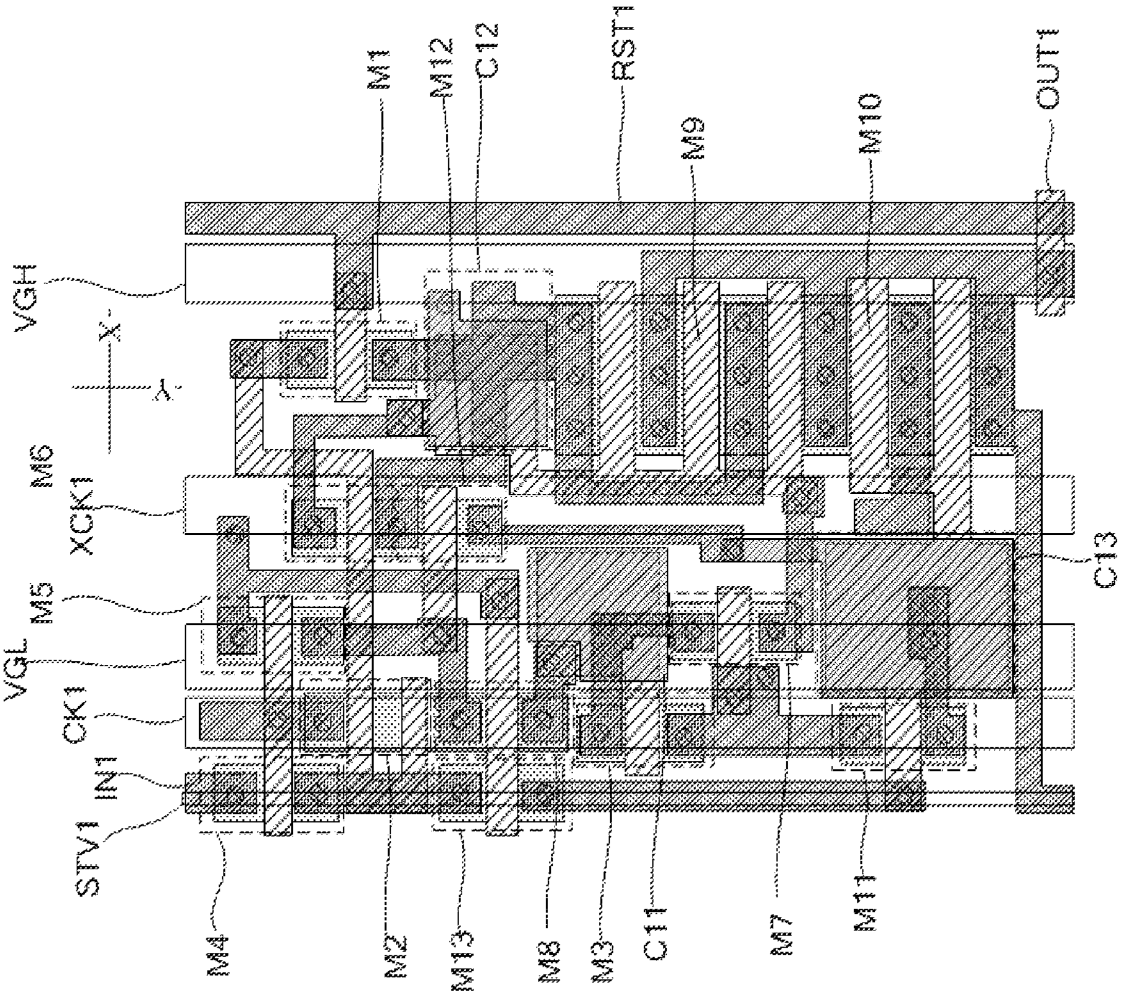
FIG. 14 illustrates a structural schematic of a shift register of a first drive circuit according to various embodiments of the present disclosure.
Figure 15:
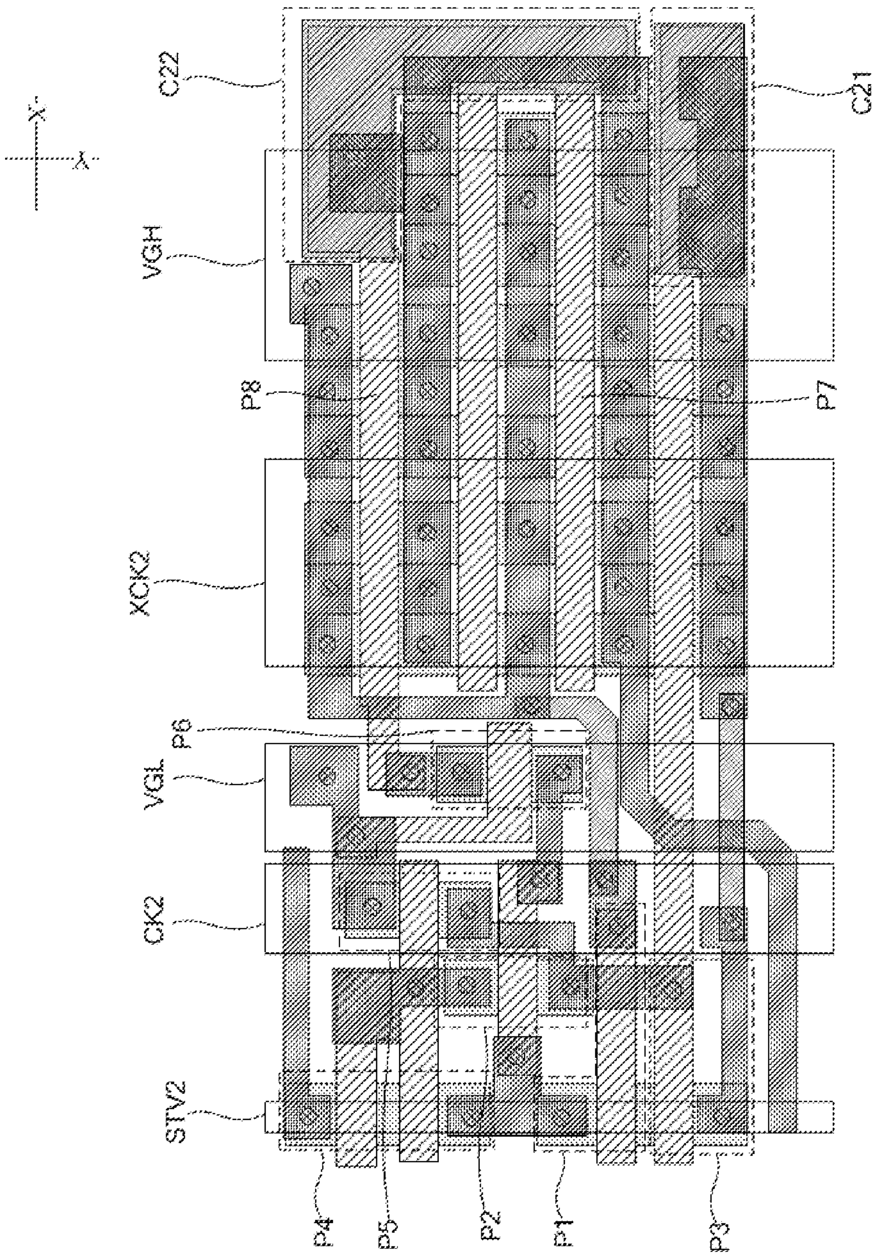
FIG. 15 illustrates a structural schematic of a shift register of a second drive circuit according to various embodiments of the present disclosure.

Referring to FIGS. 14-15, FIG. 14 illustrates a structural schematic of a shift register of a first drive circuit according to various embodiments of the present disclosure; and FIG. 15 illustrates a structural schematic of a shift register of a second drive circuit according to various embodiments of the present disclosure. The M0 signal lines in the shift register of the first drive circuit may include the start signal line STV1, the clock signal line CK1, the clock signal line XCK1, the low-level voltage signal line VGL, and the high-level voltage signal line VGH. The start signal line STV1, the clock signal line CK1, the clock signal line XCK1, the low-level voltage signal line VGL, and the high-level voltage signal line VGH may all overlap the transistors included in the shift register; and the start signal line STV1, the clock signal line CK1, and the clock signal line XCK1 may not overlap the capacitor included in the shift register, which may both improve the capacitance value change of the capacitor in the shift register and ensure high transmission signal stability on the signal line.

In addition, the N0 signal lines in the shift register of the second drive circuit may include the start signal line STV2, the clock signal line CK2, the clock signal line XCK2, the low-level voltage signal line VGL, and the high-level voltage signal line VGH. The start signal line STV2, the clock signal line CK2, the clock signal line XCK2, the low-level voltage signal line VGL, and the high-level voltage signal line VGH may all overlap the transistors included in the shift register; and the start signal line STV2, the clock signal line CK2, the low-level voltage signal line VGL, and the clock signal line XCK2 may not overlap the capacitor included in the shift register, which may both improve the capacitance value change of the capacitor in the shift register and ensure high transmission signal stability on the signal line.

Furthermore, in the M0 signal lines provided by various embodiments of the present disclosure, at least one clock signal line may not overlap any one of the y1 capacitors; and/or in the N0 signal lines, at least one clock signal line may not overlap any one of the y2 capacitors. It can be understood that the clock signal line may transmit a pulse signal; and the pulse signal may not only be easily affected by the capacitor, but the pulse signal may also affect the charging and discharging process of the capacitor. Therefore, in the present disclosure, the clock signal line and the capacitor may be designed to be not overlapped with each other, which may effectively ensure high stability of pulse signal transmission on the clock signal line and high reliability of the capacitor. As shown in FIGS. 14 and 15, the clock signal line CK1 and the clock signal line XCK1 may not overlap the capacitor of a corresponding shift register; and the clock signal line CK2 and the clock signal line XCK2 may not overlap with the capacitor of a corresponding shift register.

In one embodiment of the present disclosure, in the M0 signal lines provided by the present disclosure, the signal line with the largest width along the second direction may not overlap any one of the y1 capacitors; and/or in the N0 signal lines, the signal line with the largest width along the second direction may not overlap any one of the y2 capacitors. The size of the capacitor is proportional to the relative area of the plate. Therefore, the signal line with a relatively large width and the capacitor may be configured to be not overlapped with each other, which may avoid large capacitance value change of the capacitor in the drive circuit and ensure high signal transmission stability of the signal line and high reliability of the capacitor.

Figure 16:
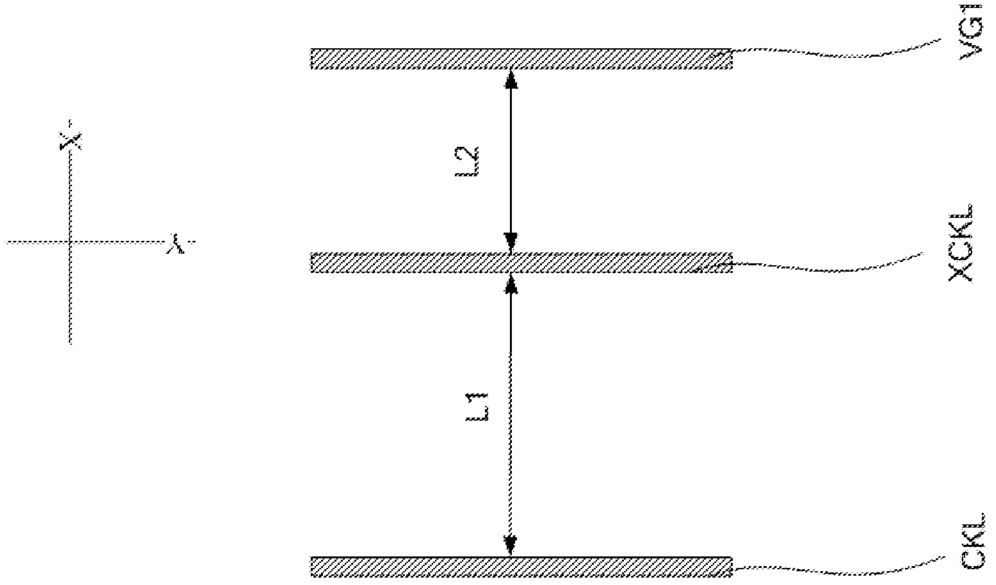
FIG. 16 illustrates a structural schematic of signal lines according to various embodiments of the present disclosure.

As shown in FIG. 16, FIG. 16 illustrates a structural schematic of signal lines according to various embodiments of the present disclosure. The M0 signal lines or the N0 signal lines provided by various embodiment of the present disclosure may include the first clock signal line CKL for transmitting the first clock signal, the second clock signal line XCKL for transmitting the second clock signal (the pulse signals transmitted by the clock signal line CKL and the clock signal line XCKL may be out of phase), and the first voltage signal line VG1 for transmitting a constant first voltage signal. The first clock signal line CKL and the first voltage signal line VG1 may be respectively located on two sides of the second clock signal line XCKL. The distance L1 between the first clock signal line CKL and the second clock signal line XCKL may be greater than the distance L2 between the first voltage signal line VG1 and the second clock signal line XCKL. The first voltage signal line VG1 may be a low-level voltage signal line or a high-level voltage signal line.

It can be understood that the pulse signals transmitted by the clock signal line CKL and the clock signal line XCKL may be out of phase. Therefore, the distance between the clock signal line CKL and the clock signal line XCKL may need set to be relatively large, which may avoid that the electric fields generated between each other may have relatively large influence on the respective pulse signals when the signals on the clock signal line CKL and the clock signal line XCKL jump. However, the first voltage signal line VG1 may transmit a constant voltage signal, which does not have rising and falling edges. Therefore, the influence may be relatively small when the distance between the first voltage signal line VG1 and the clock signal line is small; and the distance L2 between the first voltage signal line VG1 and the second clock signal line XCKL may be set to be less than the distance L1 between the first clock signal line CKL and the second clock signal line XCKL, thereby optimizing the wire layout space.

Figure 17:
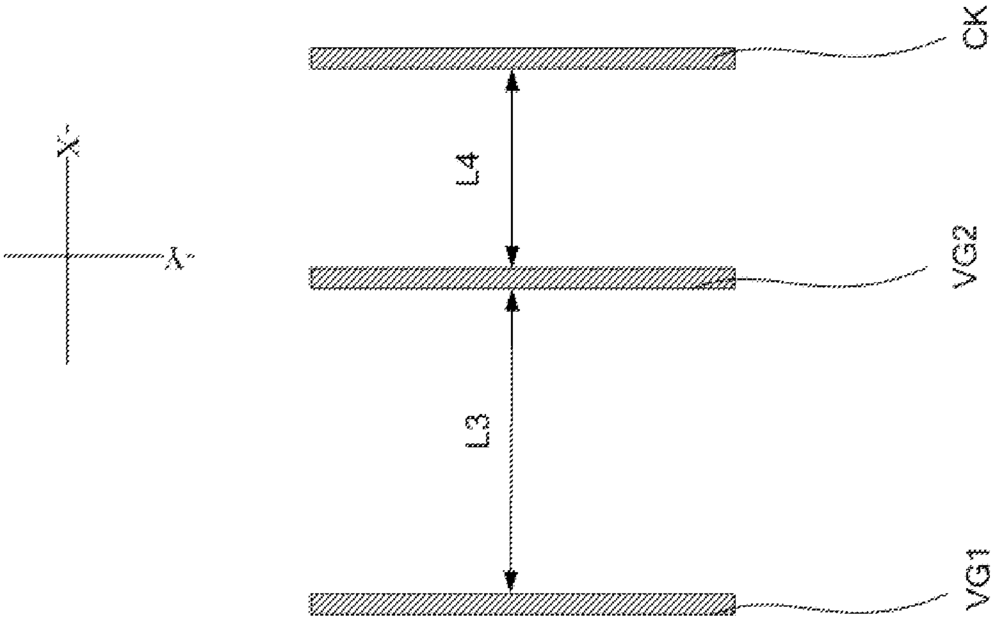
FIG. 17 illustrates another structural schematic of signal lines according to various embodiments of the present disclosure.

As shown in FIG. 17, FIG. 17 illustrates another structural schematic of signal lines according to various embodiments of the present disclosure. The M0 signal lines or the N0 signal lines may include the first voltage signal line VG1 for transmitting a constant first voltage signal, the second voltage signal line VG2 for transmitting a constant second voltage signal, and the first clock signal line CK for transmitting the first clock signal. The first voltage signal line VG1 and the first clock signal line CK may be respectively located on two sides of the second voltage signal line VG2, where the distance L3 between the first voltage signal line VG1 and the second voltage signal line VG2 may be greater than the distance L4 between the first clock signal line CK and the second voltage signal line VG2.

It can be understood that the first voltage signal line VG1 and the second voltage signal line VG2 provided in various embodiments of the present disclosure may transmit voltage signals of different levels. That is, when the first voltage signal line VG1 is a high-level voltage signal line, the second voltage signal line VG2 may be a low-level voltage signal line; and when the first voltage signal line VG1 is a low-level voltage signal line, the second voltage signal line VG2 may be a high-level voltage signal line. Therefore, in order to have high signal transmission stability for the voltage signal line VG1 and the second voltage signal line VG2, the distance between the first voltage signal line VG1 and the second voltage signal line VG2 may be configured to be relatively large in the present disclosure to avoid the mutual influence between the two signal lines which may make respective transmission signal stability relatively poor and result in unstable output signal of the drive circuit.

Figure 18:
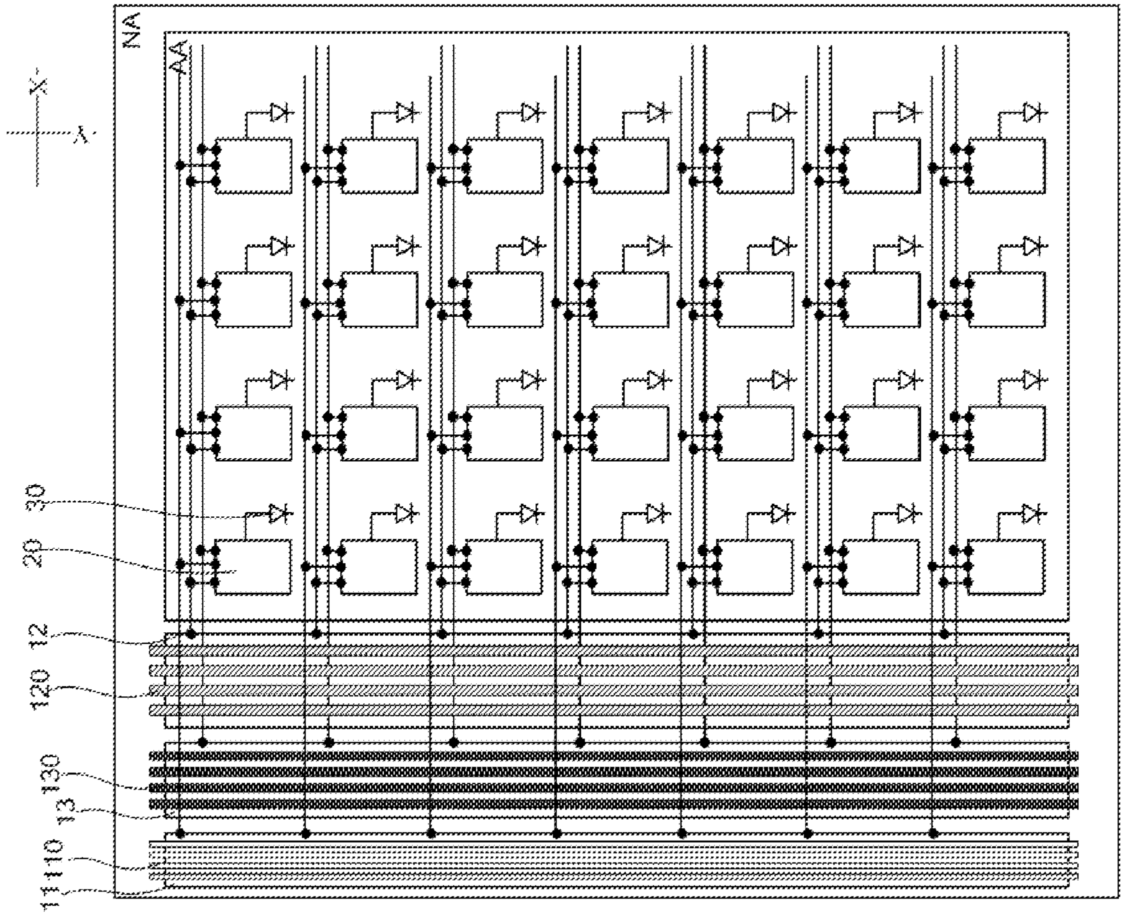
FIG. 18 illustrates a structural schematic of another display panel according to various embodiments of the present disclosure.

As shown in FIG. 18, FIG. 18 illustrates a structural schematic of another display panel according to various embodiments of the present disclosure. The drive circuits may further include the third drive circuit 13, the signal line groups may further include the third signal line group, and the third signal line group may include P signal lines that provide signals for the third drive circuit 13, where P≥1; along the direction perpendicular to the surface of the display panel, the P0 signal lines 130 in the third signal line group may overlap the third drive circuit 13, where 1≤P0≤P; the third drive circuit 13 may include S3 level shift registers extending along the first direction Y, where S3≥2; and along the second direction X, the width of the third drive circuit 13 is W3, and the total width of the P0 signal lines 130 in the third signal line group is D3, where W2>W3, and D3/W3>D2/W2>D1/W1.

It can be understood that the drive circuits provided by various embodiments of the present disclosure may include the first drive circuit, the second drive circuit, and the third drive circuit. The width W2 of the second drive circuit may be greater than the width W3 of the third drive circuit; and the width W3 of the third drive circuit provided by various embodiments of the present disclosure may be between the width W1 of the first drive circuit and the width W2 of the second drive circuit, where the total width D3 of the P0 signal lines 130 provided by various embodiments of the present disclosure may be relatively large, such that D3/W3>D2/W2>D1/W1.

When the width W3 of the third drive circuit is less than the width of the second drive circuit W2 and the output requirement of the third drive circuit is relatively high, the widths of a part of signal lines in the corresponding P signal lines may be relatively wide. In order not to affect the frame space, the second drive circuit may need to be configured to overlap the third drive circuit as possible. The situation at this point may be that W3 is not excessively large, but D3 is relatively large, such that D3/W3>D2/W2>D1/W1. At this point, since D3 is relatively large, that is, the P0 signal lines of the P signal lines may be configured to overlap the third drive circuit, thereby without increasing the frame region.

As shown in FIG. 18, in the technical solutions provided by various embodiments of the present disclosure, optionally, the first drive circuit 11, the third drive circuit 13, and the second drive circuit 12 may be arranged side by side along the second direction X, such that it is convenient to provide different drive signals for each row of pixel circuits.

Furthermore, optionally, along the second direction X, the first drive circuit 11, the third drive circuit 13, and the second drive circuit 12 may be sequentially arranged from the frame region NA of the display panel to the display region AA of the display panel; the first drive circuit 11 may provide light-emitting control signals for the light-emitting control transistors of the pixel circuit 20; the second drive circuit 12 may provide control signals for the PMOS-type transistors in the pixel circuit 20; and the third drive circuit 13 may provide control signals for the NMOS-type transistors in the pixel circuit 20, and the NMOS-type transistors may be connected to the gate electrodes of the drive transistors.

It should be noted that the pixel circuit provided by various embodiments of the present disclosure may include the drive transistor, the light-emitting control transistor, and other NMOS-type transistors and PMOS-type transistors. The drive transistor may be configured to generate a drive current, and the light-emitting element in the pixel circuit may emit light in response to the drive circuit. The light-emitting control transistor may be configured to transmit the drive current to the light-emitting element according to the control of the light-emitting control signal. The other NMOS-type transistors and PMOS-type transistors may be configured for the control including resetting the pixel circuit, obtaining the threshold value of the drive transistor, and the like, which may be same as the existing technology and may not be described in detail in the present disclosure.

In one embodiment of the present disclosure, the display panel provided by the present disclosure may be a single-sided drive panel structure. As shown in FIG. 18, the first drive circuit 11, the second drive circuit 12, and the third drive circuit of the drive circuit may be located on one side of the display region AA, and the pixel circuit 20 may be driven by the single-sided drive circuits. Or, the display panel provided by the present disclosure may also be a double-sided drive panel structure; as shown in FIG. 19, the drive circuits may include the first drive circuits 11 located on both sides of the display region AA, the second drive circuits 12 located on both sides of the display region AA, and the third drive circuits 13 located on both sides of the display region AA; and the pixel circuit 20 may be driven by the double-sided drive circuits.

Figure 19:
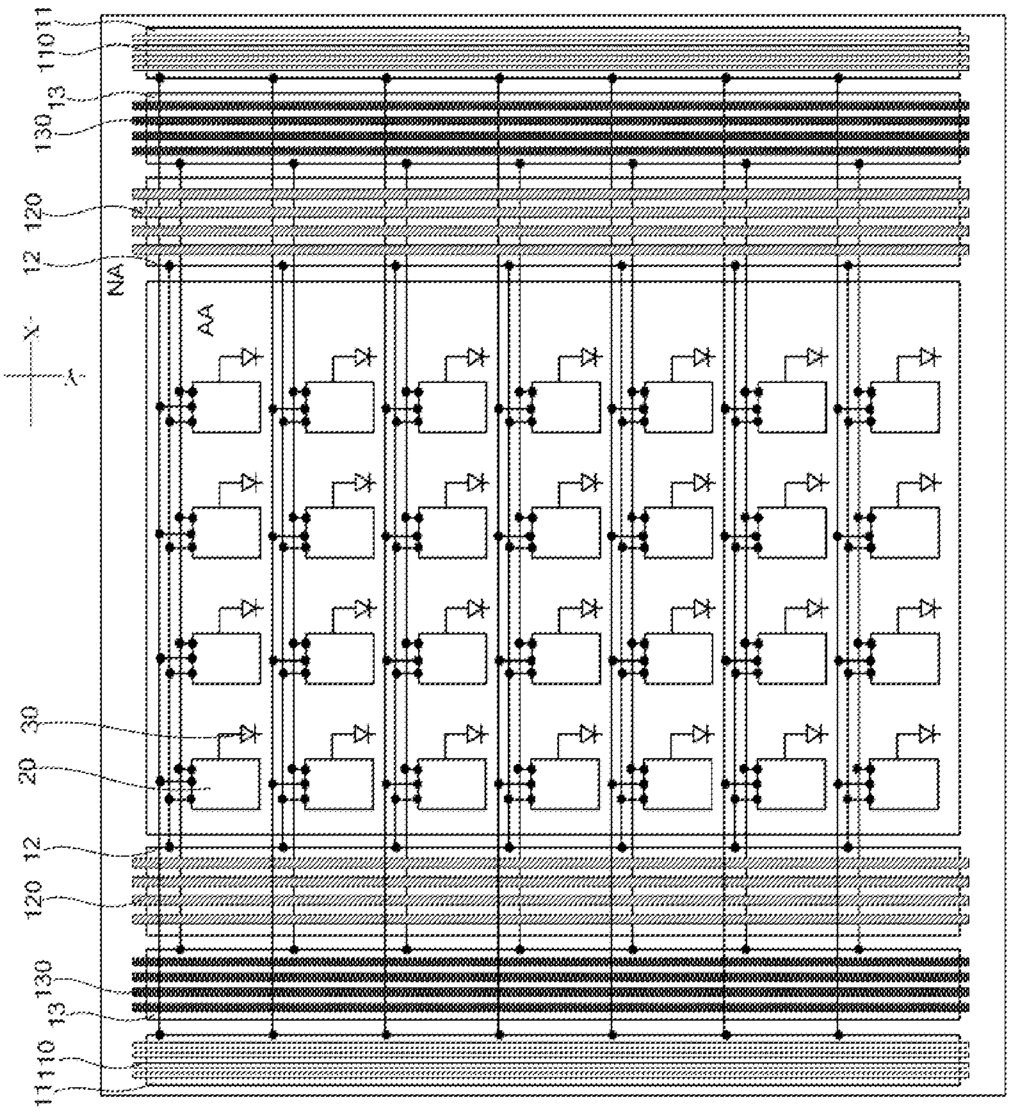
FIG. 19 illustrates a structural schematic of another display panel according to various embodiments of the present disclosure.

As shown in FIG. 19, the double-sided drive panel structure may be provided by various embodiments of the present disclosure. The pixel circuits 20 in a same row may be simultaneously driven by two first drive circuits 11 located on different sides of the display region AA; the pixel circuits 20 in a same row may be simultaneously driven by two second drive circuits 12 located on different sides of the display region AA; and the pixel circuits 20 in a same row may be simultaneously driven by two third drive circuits 13 located on different sides of the display region AA.

Figure 20:
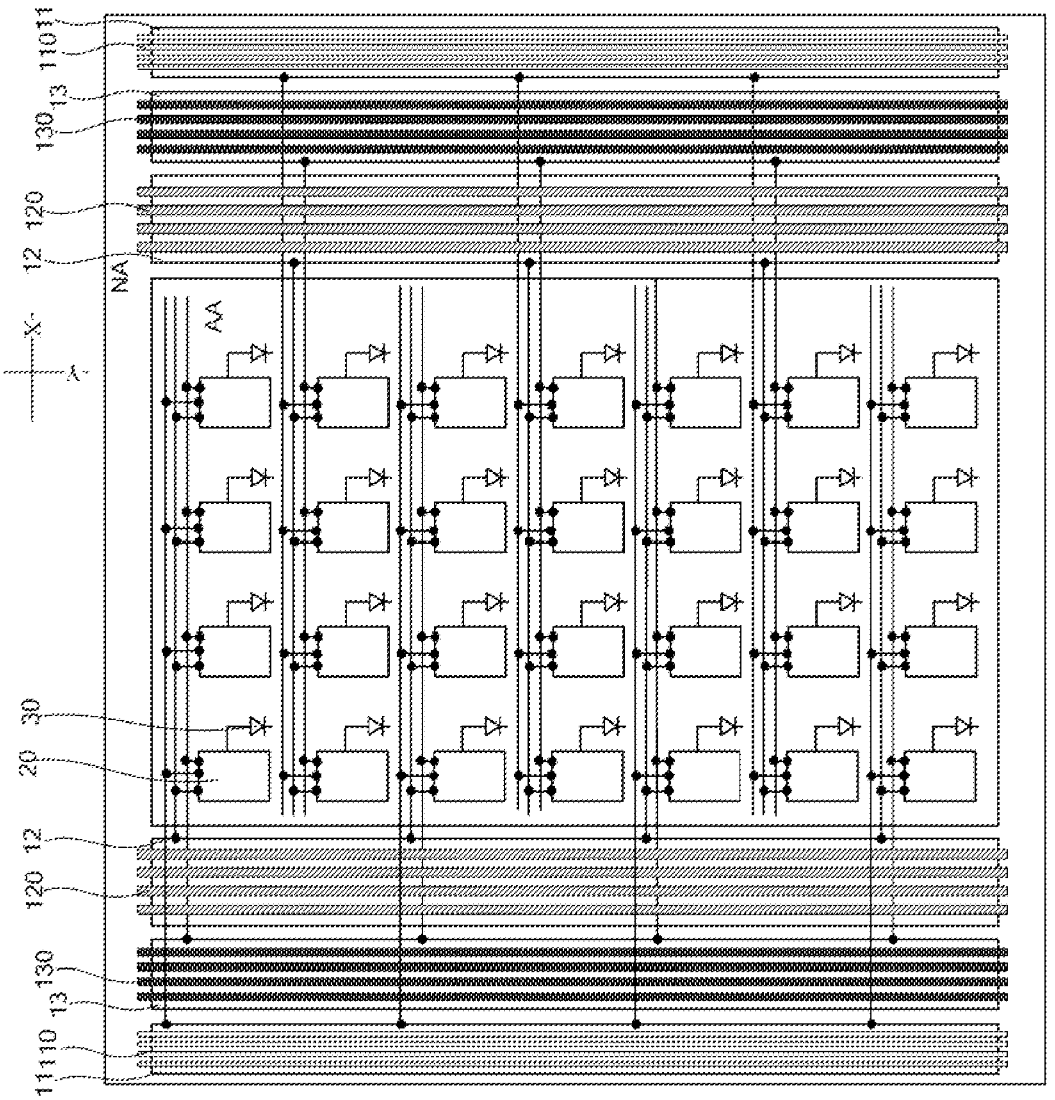
FIG. 20 illustrates a structural schematic of another display panel according to various embodiments of the present disclosure.

Or, as shown in FIG. 20, the double-sided driven panel structure may be provided by various embodiments of the present disclosure. The pixel circuits 20 in different rows may be respectively driven by two first drive circuits 11 located on different sides of the display region AA; the pixel circuits 20 in different rows may be respectively driven by two second drive circuits 12 located on different sides of the display region AA; and the pixel circuits 20 in different rows may be respectively driven by two third drive circuits 13 located on different sides of the display region AA.

In one embodiment of the present disclosure, along the second direction X, the width of the output transistor of the first drive circuit 11 may be less than the width of the output transistor of the third drive circuit 13; and the width of the output transistor of the third drive circuit 13 may be less than the width of the output transistor of the second drive circuit 12. The output transistor may be a transistor connected to the output terminal of the shift register and may be configured to output related control signals to the output terminal of the shift register. Referring to FIGS. 8-13, the shift register of the first drive circuit 11 may be shown in FIGS. 8-9, where the output transistors of the shift register of the first drive circuit may be the ninth transistor M9 and the tenth transistor M10; the ninth transistor M9 may be configured to transmit the output signal of the high-level voltage signal line VGH to the output terminal OUT1 of the shift register; and the tenth transistor M10 may be configured to transmit the low-level voltage signal line VGL output signal to the output terminal OUT1 of the shift register. The shift register of the second drive circuit 12 may be shown in FIGS. 10-11, where the output transistors of the shift register of the second drive circuit may be the seventh transistor P7 and the eighth transistor P8; the seventh transistor P7 may be configured to transmit the output signal of the high-level voltage signal line VGH to the output terminal OUT2 of the shift register, and the eighth transistor P8 may be configured to transmit the output pulse signal output of the clock signal line XCK2 to the output terminal OUT2 of the shift register. The shift register of the third drive circuit 13 may be shown in FIGS. 12-13, where the output transistors of the shift register of the third drive circuit may be the ninth transistor N9 and the tenth transistor N10; the ninth transistor N9 may be configured to transmit the output signal of the high-level voltage signal line VGH to the output terminal OUT3 of the shift register; and the tenth transistor N10 may be configured to transmit the output signal of the low-level voltage signal line VGL to the output terminal OUT3 of the shift register.

It should be noted that the shift registers shown in the first drive circuit, the second drive circuit, and the third drive circuit provided by various embodiments of the present disclosure may not be limited to the shift registers shown in FIGS. 8-13 and may also be other types of shift register structures, which may not be limited according to various embodiments of the present disclosure.

In one embodiment of the present disclosure, the relationship, provided by the present disclosure, of the width of the first drive circuit W1, the width of the second drive circuit W2, the width of the third drive circuit W3, the total width of the M0 signal lines D1, the total width of the N0 signal lines D2, and the total width of the P0 signal lines D3 may be $(D3/W3-D2/W2)<(D2/W2-D1/W1)$. The shift registers in the second drive circuit and the third drive circuit may have relatively high requirement for output signals, while the shift register in the first drive circuit may have relatively low requirement for output signals. Therefore, in the present disclosure, the values of D3/W3 and D2/W2 may be designed to be relatively close with each other to fully avoid increased frame region problem caused by corresponding signal lines having relatively wide widths.

In one embodiment of the present disclosure, the relationship between the M0 signal lines, the N0 signal lines, and the P0 signal lines provided by the present disclosure may be set as $M0<P0<N0$. In various embodiments of the present disclosure, the width of the second drive circuit may be greater than the width of the third drive circuit, the width of the third drive circuit may be greater than the width of the first drive circuit, and the number of signal lines may be further configured as $M0<P0<N0$. The number of signal lines corresponding to the second drive circuit are relatively large, or the widths of the signal lines corresponding to the second drive circuit are relatively wide; therefore, N0 may be configured to be relatively large to effectively prevent the second drive circuit and its corresponding signal lines from occupying excessive frame region. The width of the third drive circuit is less than the width of the second drive circuit. If the output requirement of the third drive circuit is relatively high, the number of corresponding signal lines may also be relatively large, or the widths of the signal lines may be relatively large. Therefore, P0 may be configured to be relatively large to effectively prevent the second drive circuit and its corresponding signal lines from occupying excessive frame region. The first drive circuit itself has a small width, and there may not be excessive space to overlap the corresponding signal lines. Therefore, M0 may be configured to be relatively small; and such configuration may ensure the optimization of the overlapping between the signal lines and the drive circuit and may reduce the frame width of the display panel.

In one embodiment of the present disclosure, the M0 signal lines provided by the present disclosure may include the third clock signal line for transmitting the third clock signal; the N0 signal lines may include the fourth clock signal line for transmitting the fourth clock signal; and the P0 signal lines may include the fifth clock signal line for transmitting the fifth clock signal. The width of the third clock signal line may be less than the width of the fifth clock signal line, and the width of the fifth clock signal line may be less than the width of the fourth clock signal line. The width of the second drive circuit provided by various embodiments of the present disclosure may be greater than the width of the third drive circuit, and the width of the third drive circuit may be greater than the width of the first drive circuit. Furthermore, the width of the third clock signal line may be designed to be less than the width of the fifth clock signal line, and the width of the fifth clock signal line may be designed to be less than the width of the fourth clock signal line, which may ensure the match of the corresponding clock signal lines of different drive circuits and improve the stability and reliability of signals transmitted by different clock signal lines.

In one embodiment of the present disclosure, the M0 signal lines provided by the present disclosure may include the third voltage signal line for transmitting the third voltage signal; the N0 signal lines may include the fourth voltage signal line for transmitting the fourth voltage signal; and the P0 signal lines may include the fifth voltage signal line for transmitting the fifth voltage signal. The width of the third voltage signal line may be less than the width of the fourth voltage signal line, and the width of the fourth voltage signal line may be less than the width of the fifth voltage signal line. The width of the second drive circuit provided by various embodiment of the present disclosure may be greater than the width of the third drive circuit, and the width of the third drive circuit may be greater than the width of the first drive circuit. Furthermore, the width of the third voltage signal line may be designed to be less than the width of the fourth voltage signal line, and the width of the fourth voltage signal line may be designed to be less than the width of the fifth voltage signal line, which may ensure the match of the corresponding clock signal lines of different drive circuits and improve the stability and reliability of signals transmitted by different clock signal lines.

Correspondingly, various embodiments of the present disclosure also provide a display device, including the display panel provided in any one of the above-mentioned embodiments.

Figure 21:
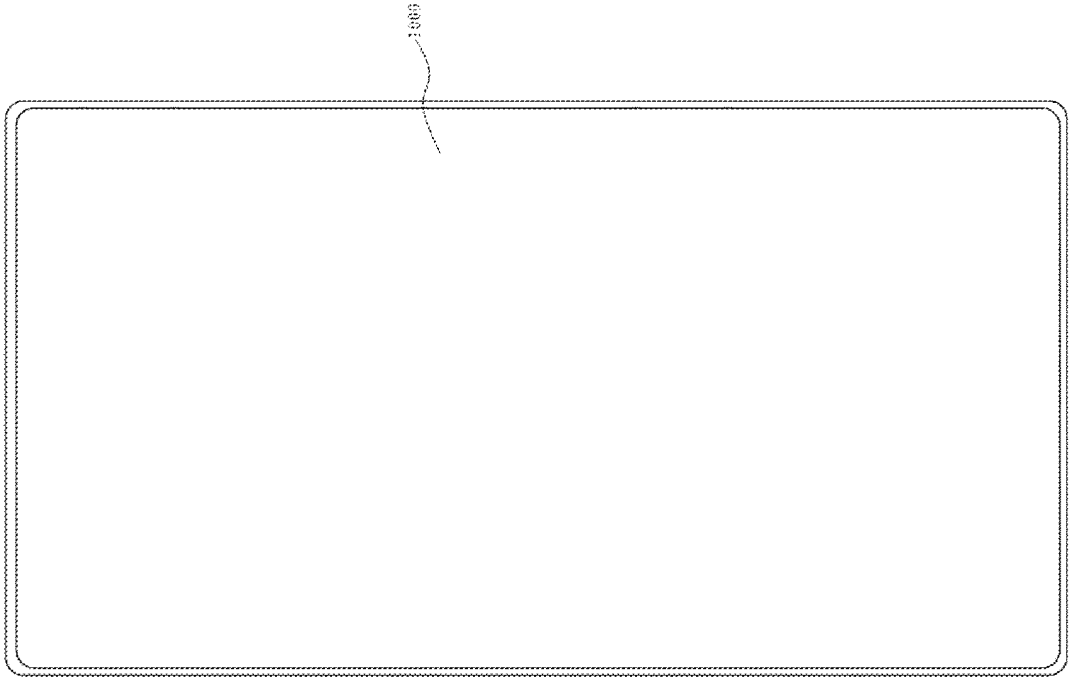
FIG. 21 illustrates a structural schematic of a display device according to various embodiments of the present disclosure.

As shown in FIG. 21, FIG. 21 illustrates a structural schematic of a display device according to various embodiments of the present disclosure. A display device 1000 provided by various embodiments of the present disclosure may be a mobile terminal device.

In other embodiments of the present disclosure, the display device provided by the present disclosure may also be an electronic display device such as a mobile phone, a computer, a vehicle-mounted terminal, and the like, which may not be limited by the present disclosure.

Various embodiments of the present disclosure provide the display panel and the display device. The M0 signal lines may be overlapped with the first drive circuit, and the N0 signal lines may be overlapped with the second drive circuit, which may reduce the area occupied by a part of the signal lines and reduce the frame width of the display device. Furthermore, in various embodiments of the present disclosure, the relationship between the width W1 of the first drive circuit, the width W2 of the second drive circuit, the total width D1 of the M0 signal lines, and the total width D2 of the N0 signal lines may be configured as W2>W1, D2>D1, and D2/W2>D1/W1. The overlapping configuration of each of the shift register with a relatively large width and the shift register with a relatively small width and the total width of the respective corresponding signal line may be further optimized, the occupied area of the drive circuit and the signal lines may be sufficiently reduced, and the frame width of the display device may be further reduced.

The above-mentioned description of disclosed embodiments may make those skilled in the art implement or use the present disclosure. Various modifications to such embodiments may be obvious to those skilled in the art, and the general principles defined herein may be implemented in other embodiments without departing from the spirit or scope of the present disclosure. Therefore, the present disclosure may not be limited to various embodiments shown in the present disclosure but should conform to the widest scope consistent with the principles and novel features disclosed in the present disclosure.

What is claimed is:

1. A display panel, comprising:

a base substrate;

drive circuits and pixel circuits, wherein the drive circuits and the pixel circuits are arranged on the base substrate; the drive circuits provide control signals for the pixel circuits; the pixel circuits provide drive currents for light-emitting elements of the display panel; and the drive circuits include a first drive circuit and a second drive circuit; and signal line groups, wherein:

the signal line groups include a first signal line group and a second signal line group, the first signal line group includes M signal lines that provide signals for the first drive circuit, the second signal line group includes N signal lines that provide signals for the second drive circuit, M≥1, and N≥1;

in a direction perpendicular to a surface of the display panel, M0 signal lines of the first signal line group overlap with the first drive circuit and are located on a side of the first drive circuit away from the base substrate, N0 signal lines of the second signal line group overlap with the second drive circuit and are located on a side of the second drive circuit away from the base substrate, 1≤M0≤M, and 1≤N0≤N; and the first drive circuit includes S1 level shift registers extending along a first direction, and/or the second drive circuit includes S2 level shift registers extending along the first direction, a second direction is in parallel with a plane of the surface of the display panel and perpendicular to the first direction, S1≥2, and S2≥2, wherein: the first drive circuit provides a light-emitting control signal for a light-emitting control transistor of the pixel circuit;

the second drive circuit provides a control signal for a P-type transistor of the pixel circuit, or the second drive circuit provides a control signal for an N-type transistor of the pixel circuit;

a i-th signal line of the M0 signal lines and a j-th signal line of N0 signal lines are signal lines that transmit a same functional signal; and along the second direction, a width of the i-th signal line is Di, and a width of the j-th signal line is Dj, wherein:

$$Dj>Di.$$

2. The display panel according to claim 1, wherein:

the i-th signal line and the j-th signal line are clock signal lines;

the j-th signal line include a j1 signal line and a j2 signal line, along the second direction, the j2 signal line is on a side of the j1 signal line facing a display region of the display panel, a width of the j1 signal line is Dj1, and a width of the j2 signal line is Dj2, wherein:

$$Dj1\geq Di, \text{ and/or } Dj2\geq Di.$$

3. The display panel according to claim 2, wherein:

$$Dj2>Dj1.$$

4. The display panel according to claim 1, wherein:

the i-th signal lines and the j-th signal lines are clock signal lines; and along the second direction, a width of the first drive circuit is W1, and a width of the second drive circuit is W2, wherein:

$$Dj/W2>Di/W1.$$

5. The display panel according to claim 1, wherein:

the i-th signal lines and the j-th signal lines are high level voltage signal lines or low level voltage signal lines;

the j-th signal lines include a j1 signal line and a j2 signal line, along the second direction, the j2 signal line is located on a side of the j1 signal line facing a display region of the display panel, a width of the j1 signal line is Dj1, and a width of the j2 signal line is Dj2, wherein:

$$Dj1\geq Di, \text{ and/or } Dj2\geq Di.$$

6. The display panel according to claim 5, wherein:

$$Dj2>Dj1.$$

7. The display panel according to claim 1, wherein:

the i-th signal lines and the j-th signal lines are high level voltage signal lines or low level voltage signal lines; and along the second direction, a width of the first drive circuit is W1, a width of the second drive circuit is W2, wherein:

$$Dj/W2>Di/W1.$$

8. The display panel according to claim 1, further comprising a transistor array layer including:

the drive circuits and/or the pixel circuits;

a semiconductor layer including an active region;

a gate metal layer including a plurality of gates; and a source/drain metal layer including a plurality of source electrodes and a plurality of drain electrodes, wherein:

the M0 signal lines are located on a side of the source/drain metal layer away from the base substrate; and the N0 signal lines are located on a side of the source/drain metal layer away from the base substrate.

9. The display panel according to claim 1, wherein:

the M0 signal lines are at a same layer, and/or the N0 signal lines are at a same layer.

10. The display panel according to claim 1, wherein:

the M0 signal lines and the N0 signal lines are at a same layer; or the M0 signal lines and the N0 signal lines are not at a same layer.

11. A display panel, comprising:

a base substrate;

drive circuits and pixel circuits, wherein the drive circuits and the pixel circuits are arranged on the base substrate; the drive circuits provide control signals for the pixel circuits; the pixel circuits provide drive currents for light-emitting elements of the display panel; and the drive circuits include a first drive circuit and a second drive circuit; and signal line groups, wherein:

the signal line groups include a first signal line group and a second signal line group, the first signal line group includes M signal lines that provide signals for the first drive circuit, the second signal line group includes N signal lines that provide signals for the second drive circuit, M≥1, and N≥1;

in a direction perpendicular to a surface of the display panel, M0 signal lines of the first signal line group overlap with the first drive circuit and are located on a side of the first drive circuit away from the base substrate, N0 signal lines of the second signal line group overlap with the second drive circuit and are located on a side of the second drive circuit away from the base substrate, 1≤M0≤M, and 1≤N0≤N; and the first drive circuit includes S1 level shift registers extending along a first direction, and/or the second drive circuit includes S2 level shift registers extending along the first direction, a second direction is in parallel with a plane of the surface of the display panel and perpendicular to the first direction, S1≥2, and S2≥2, wherein:

a i-th signal line of the M0 signal lines and a j-th signal line of the N0 signal lines are signal lines that transmit a same signal; and along the second direction, a width of the i-th signal line is Di, and a width of the j-th signal line is Dj, wherein:

$$Dj>Di.$$

12. The display panel according to claim 11, wherein:

the i-th signal line and the j-th signal line are clock signal lines;

the j-th signal line include a j1 signal line and a j2 signal line, along the second direction, the j2 signal line is on a side of the j1 signal line facing a display region of the display panel, a width of the j1 signal line is Dj1, and a width of the j2 signal line is Dj2, wherein:

$$Dj1 \geq Di, \text{ and/or } Dj2 \geq Di.$$

13. The display panel according to claim 12, wherein:

$$Dj2>Dj1.$$

14. The display panel according to claim 11, wherein:

the i-th signal lines and the j-th signal lines are clock signal lines; and along the second direction, a width of the first drive circuit is W1, and a width of the second drive circuit is W2, wherein:

$$Dj/W2>Di/W1.$$

15. The display panel according to claim 11, wherein:

the i-th signal lines and the j-th signal lines are high level voltage signal lines or low level voltage signal lines;

the j-th signal lines include a j1 signal line and a j2 signal line, along the second direction, the j2 signal line is located on a side of the j1 signal line facing a display region of the display panel, a width of the j1 signal line is Dj1, and a width of the j2 signal line is Dj2, wherein:

$$Dj\geq 1Di, \text{ and/or } Dj2 \geq Di.$$

16. The display panel according to claim 15, wherein:

$$Dj2>Dj1.$$

17. The display panel according to claim 11, wherein:

the i-th signal lines and the j-th signal lines are high level voltage signal lines or low level voltage signal lines; and along the second direction, a width of the first drive circuit is W1, a width of the second drive circuit is W2, wherein:

$$Dj/W2>Di/W1.$$

18. The display panel according to claim 11, further comprising a transistor array layer including:

the drive circuits and/or the pixel circuits;

a semiconductor layer including an active region;

a gate metal layer including a plurality of gates; and a source/drain metal layer including a plurality of source electrodes and a plurality of drain electrodes, wherein:

the M0 signal lines are located on a side of the source/drain metal layer away from the base substrate; and the N0 signal lines are located on a side of the source/drain metal layer away from the base substrate.

19. A display device, comprising a display panel, including:

a base substrate;

drive circuits and pixel circuits, wherein the drive circuits and the pixel circuits are arranged on the base substrate; the drive circuits provide control signals for the pixel circuits; the pixel circuits provide drive currents for light-emitting elements of the display panel; and the drive circuits include a first drive circuit and a second drive circuit; and signal line groups, wherein:

the signal line groups include a first signal line group and a second signal line group, the first signal line group includes M signal lines that provide signals for the first drive circuit, the second signal line group includes N signal lines that provide signals for the second drive circuit, M≥1, and N≥1;

in a direction perpendicular to a surface of the display panel, M0 signal lines of the first signal line group overlap with the first drive circuit and are located on a side of the first drive circuit away from the base substrate, N0 signal lines of the second signal line group overlap with the second drive circuit and are located on a side of the second drive circuit away from the base substrate, 1≤M0≤M, and 1≤N0≤N; and the first drive circuit includes S1 level shift registers extending along a first direction, and/or the second drive circuit includes S2 level shift registers extending along the first direction, a second direction is in parallel with a plane of the surface of the display panel and perpendicular to the first direction, S1≥2, and S2≥2, wherein*: the first drive circuit provides a light-emitting control signal for a light-emitting control transistor of the pixel circuit;

the second drive circuit provides a control signal for a P-type transistor of the pixel circuit, or the second drive circuit provides a control signal for an N-type transistor of the pixel circuit;

a i-th signal line of the M0 signal lines and a j-th signal line of N0 signal lines are signal lines that transmit a same functional signal; and along the second direction, a width of the i-th signal line is Di, and a width of the j-th signal line is Dj, wherein:

$$Dj>Di.$$

20. A display device comprising the display panel of claim 11.

* * * * *